(12) United States Patent
Terashima et al.

(10) Patent No.: US 9,152,027 B2
(45) Date of Patent: Oct. 6, 2015

(54) PROJECTOR AND METHOD FOR CONTROLLING A PROJECTOR DISCHARGE LAMP

(75) Inventors: Tetsuo Terashima, Azumino (JP); Shun Sato, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 531 days.

(21) Appl. No.: 13/566,514

(22) Filed: Aug. 3, 2012

(65) Prior Publication Data

US 2013/0088687 A1 Apr. 11, 2013

(30) Foreign Application Priority Data

Oct. 6, 2011 (JP) ................................. 2011-221963

(51) Int. Cl.
*G03B 21/20* (2006.01)
*H05B 41/288* (2006.01)
*H05B 41/292* (2006.01)

(52) U.S. Cl.
CPC ........ *G03B 21/2026* (2013.01); *G03B 21/2053* (2013.01); *H05B 41/2883* (2013.01); *H05B 41/2921* (2013.01); *H05B 41/2928* (2013.01); *Y02B 20/208* (2013.01)

(58) Field of Classification Search
CPC ........... G03B 21/2026; G03B 21/2053; H05B 41/2928; H05B 41/2921; H05B 41/2883; Y02B 20/208
USPC ......... 353/7, 8, 51, 52, 53, 54, 55, 56, 57, 58, 353/59, 60, 85; 359/376, 377, 378, 462, 359/463, 464, 465, 466, 467, 468, 469, 470, 359/471, 472, 473, 474, 475, 476, 477
See application file for complete search history.

(56) References Cited

U.S. PATENT DOCUMENTS

| 6,232,725 | B1 * | 5/2001 | Derra et al. ............... 315/209 R |
| 7,023,144 | B2 * | 4/2006 | Suzuki et al. ................. 315/246 |
| 7,170,237 | B2 * | 1/2007 | Suzuki et al. ................. 315/246 |
| 7,511,433 | B2 * | 3/2009 | Okawa .......................... 315/224 |
| 7,855,512 | B2 * | 12/2010 | Ozasa et al. .................... 315/49 |
| 7,946,715 | B2 * | 5/2011 | Yamauchi et al. .............. 353/85 |
| 8,217,582 | B2 * | 7/2012 | Yamauchi et al. ......... 315/209 T |
| 8,237,378 | B2 * | 8/2012 | Terashima .................... 315/307 |

(Continued)

FOREIGN PATENT DOCUMENTS

| JP | A-2003-102030 | 4/2003 |
| JP | A-2008-103091 | 5/2008 |

(Continued)

*Primary Examiner* — Bao-Luan Le
(74) *Attorney, Agent, or Firm* — Oliff PLC

(57) ABSTRACT

A control section relatively decreases an absolute value of a current supplied to a discharge lamp in a first period and relatively increases the absolute value in a second period, and in the second period, performs any one of a first control for supplying an alternating current to the discharge lamp, a second control for supplying, to the discharge lamp, a current in which a maximum duration of a first polarity is longer than that in the first control, and a third control for supplying, to the discharge lamp, a current in which a maximum duration of a second polarity is longer than that in the first control, and as the state of deterioration proceeds, decreases at least one of the maximum duration of the first polarity in the second control and the maximum duration of the second polarity in the third control.

12 Claims, 14 Drawing Sheets

(56) References Cited

U.S. PATENT DOCUMENTS

| | | | |
|---|---|---|---|
| 8,324,828 B2* | 12/2012 | Yamamoto et al. | 315/291 |
| 8,450,937 B2* | 5/2013 | Yamamoto et al. | 315/209 R |
| 8,513,893 B2* | 8/2013 | Ono et al. | 315/209 R |
| 8,591,034 B2* | 11/2013 | Terashima et al. | 353/7 |
| 2006/0050246 A1* | 3/2006 | Moench et al. | 353/85 |
| 2007/0076175 A1 | 4/2007 | Nakagawa et al. | |
| 2007/0164687 A1* | 7/2007 | Watanabe et al. | 315/291 |
| 2008/0192211 A1* | 8/2008 | Kitagawa | 353/85 |
| 2009/0033808 A1* | 2/2009 | Maeda et al. | 348/756 |
| 2009/0207385 A1* | 8/2009 | Yamauchi et al. | 353/85 |
| 2009/0213341 A1* | 8/2009 | Yamauchi et al. | 353/85 |
| 2009/0231553 A1* | 9/2009 | Tanaka et al. | 353/85 |
| 2010/0013400 A1* | 1/2010 | Honsberg-Riedl et al. | 315/246 |
| 2010/0103388 A1* | 4/2010 | Yamauchi et al. | 353/85 |
| 2010/0128232 A1* | 5/2010 | Kagata et al. | 353/85 |
| 2010/0134766 A1* | 6/2010 | Takezawa | 353/85 |
| 2010/0141906 A1* | 6/2010 | Deppe et al. | 353/86 |
| 2010/0157257 A1* | 6/2010 | Nishizawa et al. | 353/85 |
| 2010/0165305 A1* | 7/2010 | Takezawa | 353/85 |
| 2010/0253920 A1 | 10/2010 | Miyazawa | |
| 2011/0025989 A1* | 2/2011 | Ono et al. | 353/85 |
| 2011/0043771 A1* | 2/2011 | Hirao | 353/85 |
| 2011/0063584 A1* | 3/2011 | Hirao et al. | 353/85 |
| 2011/0128508 A1* | 6/2011 | Yamada et al. | 353/85 |
| 2011/0310361 A1* | 12/2011 | Brueckel et al. | 353/85 |
| 2011/0317133 A1* | 12/2011 | Brueckel et al. | 353/85 |
| 2012/0026468 A1* | 2/2012 | Terashima et al. | 353/7 |
| 2012/0038755 A1 | 2/2012 | Sato et al. | |
| 2012/0044466 A1 | 2/2012 | Sato et al. | |
| 2012/0074858 A1* | 3/2012 | Ono et al. | 315/209 R |

FOREIGN PATENT DOCUMENTS

| | | |
|---|---|---|
| JP | A-2009-237302 | 10/2009 |
| JP | A-2010-243543 | 10/2010 |
| JP | A-2012-032504 | 2/2012 |
| JP | A-2012-039497 | 2/2012 |
| JP | A-2012-042707 | 3/2012 |

* cited by examiner

| DRIVE VOLTAGE Vla [V] | SECOND CONTROL AND THIRD CONTROL | | | FIRST CONTROL | |
|---|---|---|---|---|---|
| | FIRST POLARITY OR SECOND POLARITY DURATION TIME [s] | DC TIME [s] | AC FREQUENCY [Hz] | THE NUMBER OF TIMES | AC FREQUENCY [Hz] | THE NUMBER OF TIMES |
| 70 OR HIGHER AND LOWER THAN 85 | 0.0059 | 0.0042 | 300 | 50 | 133 | 2000 |
| 85 OR HIGHER AND LOWER THAN 100 | 0.0056 | 0.0036 | 255 | 50 | 133 | 2000 |
| 100 OR HIGHER AND LOWER THAN 115 | 0.0053 | 0.0031 | 229 | 50 | 266 | 2000 |
| 115 OR HIGHER | 0.0050 | 0.0025 | 200 | 50 | 533 | 2000 |

FIG. 10

| DRIVE VOLTAGE Vfa [V] | THE RATIO OF SECOND CONTROL AND THIRD CONTROL | SECOND CONTROL AND THIRD CONTROL | | | FIRST CONTROL | |
|---|---|---|---|---|---|---|
| | | DC TIME [s] | AC FREQUENCY [Hz] | THE NUMBER OF TIMES | AC FREQUENCY [Hz] | THE NUMBER OF TIMES |
| 70 OR HIGHER AND LOWER THAN 85 | 0.0333 | 0.0042 | 300 | 50 | 533 | 1500 |
| 85 OR HIGHER AND LOWER THAN 100 | 0.0025 | 0.0042 | 300 | 5 | 533 | 2000 |
| 100 OR HIGHER AND LOWER THAN 115 | 0.0012 | 0.0042 | 300 | 3 | 533 | 2500 |
| 115 OR HIGHER | 0.0003 | 0.0042 | 300 | 1 | 533 | 3000 |

FIG. 11

FIRST CONTROL

| DRIVE VOLTAGE VIa [V] | FIRST FREQUENCY [Hz] | THE NUMBER OF TIMES | SECOND FREQUENCY [Hz] | THE NUMBER OF TIMES | THIRD FREQUENCY [Hz] | THE NUMBER OF TIMES | TIME RATIO OF HIGHEST VALUE | TIME RATIO OF LOWEST VALUE |
|---|---|---|---|---|---|---|---|---|
| 70 OR HIGHER AND LOWER THAN 85 | 133 | 1000 | 266 | 1000 | 533 | 0 | — | 0.5000 |
| 85 OR HIGHER AND LOWER THAN 100 | 133 | 500 | 266 | 900 | 533 | 450 | 0.243 | 0.2703 |
| 100 OR HIGHER AND LOWER THAN 115 | 133 | 375 | 266 | 800 | 533 | 900 | 0.434 | 0.1807 |
| 115 OR HIGHER | 133 | 250 | 266 | 750 | 533 | 1250 | 0.556 | 0.1111 |

SECOND CONTROL AND THIRD CONTROL

| DRIVE VOLTAGE VIa [V] | THE RATIO OF SECOND CONTROL AND THIRD CONTROL | DC TIME [s] | AC FREQUENCY [Hz] | THE NUMBER OF TIMES |
|---|---|---|---|---|
| 70 OR HIGHER AND LOWER THAN 85 | 0.0250 | 0.0042 | 300 | 50 |
| 85 OR HIGHER AND LOWER THAN 100 | 0.0027 | 0.0042 | 300 | 5 |
| 100 OR HIGHER AND LOWER THAN 115 | 0.0014 | 0.0042 | 300 | 3 |
| 115 OR HIGHER | 0.0004 | 0.0042 | 300 | 1 |

FIG. 12

| FIRST CONTROL | | | | | | | |
|---|---|---|---|---|---|---|---|
| DRIVE VOLTAGE V1a [V] | FIRST FREQUENCY [Hz] | THE NUMBER OF TIMES | SECOND FREQUENCY [Hz] | THE NUMBER OF TIMES | THIRD FREQUENCY [Hz] | THE NUMBER OF TIMES | TIME RATIO OF HIGHEST VALUE | TIME RATIO OF LOWEST VALUE |
| 70 OR HIGHER AND LOWER THAN 85 | 133 | 1000 | 266 | 1000 | 533 | 0 | — | 0.5000 |
| 85 OR HIGHER AND LOWER THAN 100 | 133 | 500 | 266 | 900 | 533 | 450 | 0.243 | 0.2703 |
| 100 OR HIGHER AND LOWER THAN 115 | 133 | 375 | 266 | 800 | 533 | 900 | 0.434 | 0.1807 |
| 115 OR HIGHER | 133 | 250 | 266 | 750 | 533 | 1250 | 0.556 | 0.1111 |

| SECOND CONTROL AND THIRD CONTROL | | | | |
|---|---|---|---|---|
| DRIVE VOLTAGE V1a [V] | FIRST POLARITY OR SECOND POLARITY DURATION TIME [s] | DC TIME [s] | AC FREQUENCY [Hz] | THE NUMBER OF TIMES |
| 70 OR HIGHER AND LOWER THAN 85 | 0.0059 | 0.0042 | 300 | 50 |
| 85 OR HIGHER AND LOWER THAN 100 | 0.0056 | 0.0036 | 255 | 50 |
| 100 OR HIGHER AND LOWER THAN 115 | 0.0053 | 0.0031 | 229 | 50 |
| 115 OR HIGHER | 0.0050 | 0.0025 | 200 | 50 |

FIG. 13

PROJECTOR AND METHOD FOR CONTROLLING A PROJECTOR DISCHARGE LAMP

BACKGROUND

1. Technical Field

The present invention relates to a projector.

2. Related Art

A projector which uses a discharge lamp such as a high pressure mercury lamp or a metal halide lamp has been put into practical use. As such a projector, for example, in JP-A-2003-102030, a projector is disclosed which includes means for changing the intensity of a light source through color separation means or the like in synchronization with an image signal. However, JP-A-2009-237302 discloses that if the intensity of the light source is simply changed, there is a problem that electrode wear of a discharge lamp becomes noticeable.

Further, in recent years, a projector which uses a discharge lamp such as a high pressure mercury lamp or a metal halide lamp and outputs a stereoscopic image has been put into practical use.

As an example of a method of outputting the stereoscopic image, there is a method of switching and alternately outputting a right-eye image and a left-eye image (for example, an active shutter glasses type such as "XPAND beyond cinema (trademark of X6D Limited)"). In this method, the right-eye image is viewed with the right eye and the left-eye image is viewed with the left eye using active shutter glasses or the like which are synchronized with an image signal, and thus, the image is viewed stereoscopically using the parallax between the left eye and the right eye.

In a case where a stereoscopic image is projected using the method of alternately outputting the right-eye image and the left-eye image, compared with a case where a planar image (two-dimensional image) is projected in the related art, the amount of light which enters the right eye and the left eye becomes half or less. Further, if crosstalk occurs in which the right-eye image enters the left eye and the left-eye image enters the right eye, the image is not perceived stereoscopically, and thus, a period when both of the active shutters are closed is necessary. Thus, in a case where the stereoscopic image is projected using the method of alternately outputting the right-eye image and the left-eye image, compared with a case where the planar image is projected in the related art, there is a problem that the image appears dark. In order to cause the image to appear bright, a method of simply increasing drive power may be considered. However, in this method, for example, there is a problem that the power consumption of the projector is increased or deterioration of peripheral parts is facilitated as the power consumption is increased.

Further, if a control is performed so that the luminance of the discharge lamp is decreased in a period when both the active shutters are closed and is increased in a period when any one of the active shutters is opened in order to cause the image to appear bright, the temperature of the electrode of the discharge lamp is decreased in the period when the luminance of the discharge lamp is decreased, and the meltability of the tip end of the electrode becomes insufficient, so that the electrode may be deformed. If the electrode is deformed, the occurrence of flickering or the like may be caused. If flickering occurs, the brightness of an image projected during usage of the projector is changed.

In particular, in a case where the drive current of the discharge lamp is decreased as the state of deterioration of the discharge lamp proceeds, the brightness of the discharge lamp is decreased and the meltability of the tip end of the electrode becomes insufficient, and thus, the electrode is easily deformed. Thus, in order to project the stereoscopic image to appear bright while suppressing deformation of the electrode, a particular consideration is necessary.

SUMMARY

An advantage of some aspects of the invention is to provide a projector which is capable of projecting an image to appear bright while suppressing deformation of an electrode of a discharge lamp.

An aspect of the invention is directed to a projector which switches and alternately outputs a first image and a second image at a predetermined timing, including: a discharge lamp which includes a first electrode and a second electrode; a discharge lamp drive section which supplies an electric current for driving the discharge lamp to the discharge lamp; a state detecting section which detects the state of deterioration of the discharge lamp; and a control section which controls the discharge lamp drive section, wherein a period interposed between switching timings which are temporally adjacent to each other starts in a first period and ends in a second period, wherein the control section controls the discharge lamp drive section so that an absolute value of the electric current is relatively decreased in the first period and is relatively increased in the second period, wherein in the second period, the control section performs any one of a first control for controlling the discharge lamp drive section to supply an alternating current to the discharge lamp, a second control for controlling the discharge lamp drive section to supply, to the discharge lamp, an electric current in which a maximum value of a time when a first polarity in which the first electrode becomes the anode is continued is longer than a maximum value of a time when the first polarity is continued in the first control, and a third control for controlling the discharge lamp drive section to supply, to the discharge lamp, an electric current in which a maximum value of a time when a second polarity in which the second electrode becomes the anode is continued is longer than a maximum value of a time when the second polarity is continued in the first control, and wherein as the state of deterioration proceeds, the control section decreases at least one of the maximum value of the time when the first polarity is continued in the second control and the maximum value of the time when the second polarity is continued in the third control.

The state detecting section may detect a drive voltage of the discharge lamp, a temporal change in the drive voltage of the discharge lamp, the amount of light of the discharge lamp, a temporal change in the amount of light of the discharge lamp, an accumulative lighting time of the discharge lamp, or the like, as a value indicating the degree of the state of deterioration, for example.

If the state of deterioration proceeds, the meltability of the electrode is decreased, and the electrode may be deformed. According to this aspect of the invention, as the state of deterioration of the discharge lamp proceeds, at least one of the maximum value of the time when the first polarity is continued in the second control and the maximum value of the time when the second polarity is continued in the third control is decreased, and thus, it is possible to shorten a time when a state where one electrode of the discharge lamp becomes the cathode is continued. Thus, it is possible to suppress positively charged particles such as metallic ions from colliding with the electrode in a state where the temperature of the electrode is low. Accordingly, it is possible to suppress deformation of the electrode.

Further, according to the aspect of the invention, the control section controls the discharge lamp drive section so that the absolute value of the electric current supplied to the discharge lamp is relatively decreased in the first period and is relatively increased in the second period, and thus, it is possible to realize a projector which is capable of projecting an image to appear bright.

Another aspect of the invention is directed to a projector which switches and alternately outputs a first image and a second image at a predetermined timing, including: a discharge lamp which includes a first electrode and a second electrode; a discharge lamp drive section which supplies an electric current for driving the discharge lamp to the discharge lamp; a state detecting section which detects the state of deterioration of the discharge lamp; and a control section which controls the discharge lamp drive section, wherein a period interposed between switching timings which are temporally adjacent to each other starts in a first period and ends in a second period, wherein the control section controls the discharge lamp drive section so that an absolute value of the electric current is relatively decreased in the first period and is relatively increased in the second period, wherein in the second period, the control section performs any one of a first control for controlling the discharge lamp drive section to supply an alternating current to the discharge lamp, a second control for controlling the discharge lamp drive section to supply, to the discharge lamp, an electric current including a period when a maximum value of a time when a first polarity in which the first electrode becomes the anode is continued is longer than a maximum value of a time when the first polarity is continued in the first control, and a third control for controlling the discharge lamp drive section to supply, to the discharge lamp, an electric current including a period when a maximum value of a time when a second polarity in which the second electrode becomes the anode is continued is longer than a maximum value of a time when the second polarity is continued in the first control, and wherein as the state of deterioration proceeds, the control section decreases the ratio of a total value of times when the second control and the third control are performed to a total value of times when the first control, the second control and the third control are performed.

If the state of deterioration proceeds, the meltability of the electrode is decreased, and the electrode may be deformed. According to the aspect of the invention, as the state of deterioration of the discharge lamp proceeds, the ratio of the total value of the times when the second control and the third control are performed to the total value of the times when the first control, the second control and the third control are performed is decreased, and thus, it is possible to decrease the ratio of a time when a state where one electrode of the discharge lamp becomes the cathode is continued long to a lighting time of the discharge lamp. Thus, it is possible to suppress positively charged particles such as metallic ions from colliding with the electrode in a state where the temperature of the electrode is low. Accordingly, it is possible to suppress deformation of the electrode.

Further, according to the aspect of the invention, the control section controls the discharge lamp drive section so that the absolute value of the electric current supplied to the discharge lamp is relatively decreased in the first period and is relatively increased in the second period, and thus, it is possible to realize a projector which is capable of projecting an image to appear bright.

In the projector, as the state of deterioration proceeds, the control section may increase frequency in the first control.

Accordingly, it is possible to stabilize a discharge starting point in a case where the state of deterioration of the discharge lamp proceeds.

In the projector, the control section may include, as the first control, a first AC control for controlling the discharge lamp drive section to supply an alternating current of a first frequency to the discharge lamp and a second AC control for controlling the discharge lamp drive section to supply an alternating current of a second frequency different from the first frequency to the discharge lamp.

As the electric currents of the different frequencies are supplied to the discharge lamp in the first control, it is possible to suppress deformation of a protrusion on the electrode which serves as the discharge starting point, and to stabilize the discharge starting point.

In the projector, as the state of deterioration proceeds, the control section may increase the ratio of a total value of a time when frequency becomes the highest value in the first control to a total value of a time when the first control is performed.

Accordingly, the ratio in which the electric current of a relatively high frequency is supplied to the discharge lamp is increased, and thus, even in a case where the state of deterioration of the discharge lamp proceeds, the discharge starting point is easily stabilized.

In the projector, as the state of deterioration proceeds, the control section may decrease the ratio of a total value of a time when frequency becomes the lowest value in the first control to a total value of a time when the first control is performed.

Accordingly, the ratio in which the electric current of a relatively high frequency is supplied to the discharge lamp is increased, and thus, even in a case where the state of deterioration of the discharge lamp proceeds, the discharge starting point is easily stabilized.

In the projector, the length of the second period may be longer than the length of the first period.

As the length of the second period becomes long, the influence on the discharge lamp becomes large as a state where the temperature of the electrode is low is continued in the second period. Thus, in a case where the length of the second period is longer than the length of the first period, the effect of suppressing deformation of the electrode becomes large.

BRIEF DESCRIPTION OF THE DRAWINGS

The invention will be described with reference to the accompanying drawings, wherein like numbers reference like elements.

FIG. 10 is a table illustrating a drive condition in a first specific example.

FIG. 11 is a table illustrating a drive condition in a second specific example.

FIG. 12 is a table illustrating a drive condition in a third specific example.

FIG. 13 is a table illustrating a drive condition in a fourth specific example.

DESCRIPTION OF EXEMPLARY EMBODIMENTS

Hereinafter, preferred embodiments of the invention will be described in detail with reference to the accompanying drawings. The embodiments described below do not unsuitably limit content of the invention disclosed in the appended claims. Further, all configurations described below are not limited as essential components of the invention.

1. Projector According to Present Embodiment

Figure 1:
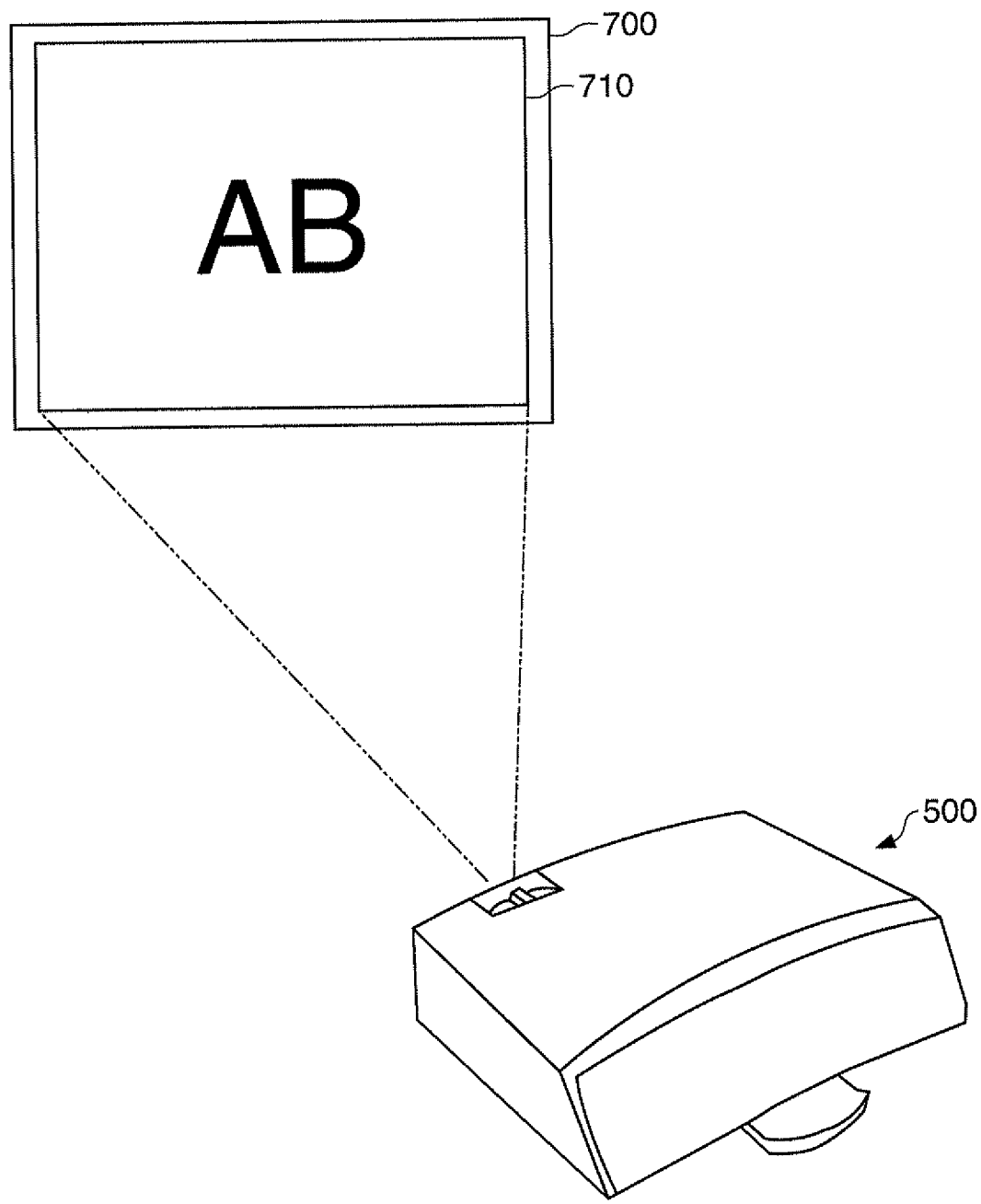
FIG. 1 is a perspective view illustrating a projector according to an embodiment of the invention.

FIG. 1 is a perspective view illustrating a projector 500 according to an embodiment of the invention. In an example shown in FIG. 1, the projector 500 projects an image 710 onto a screen 700.

1-1. Optical System of Projector According to the Present Embodiment

Figure 2:
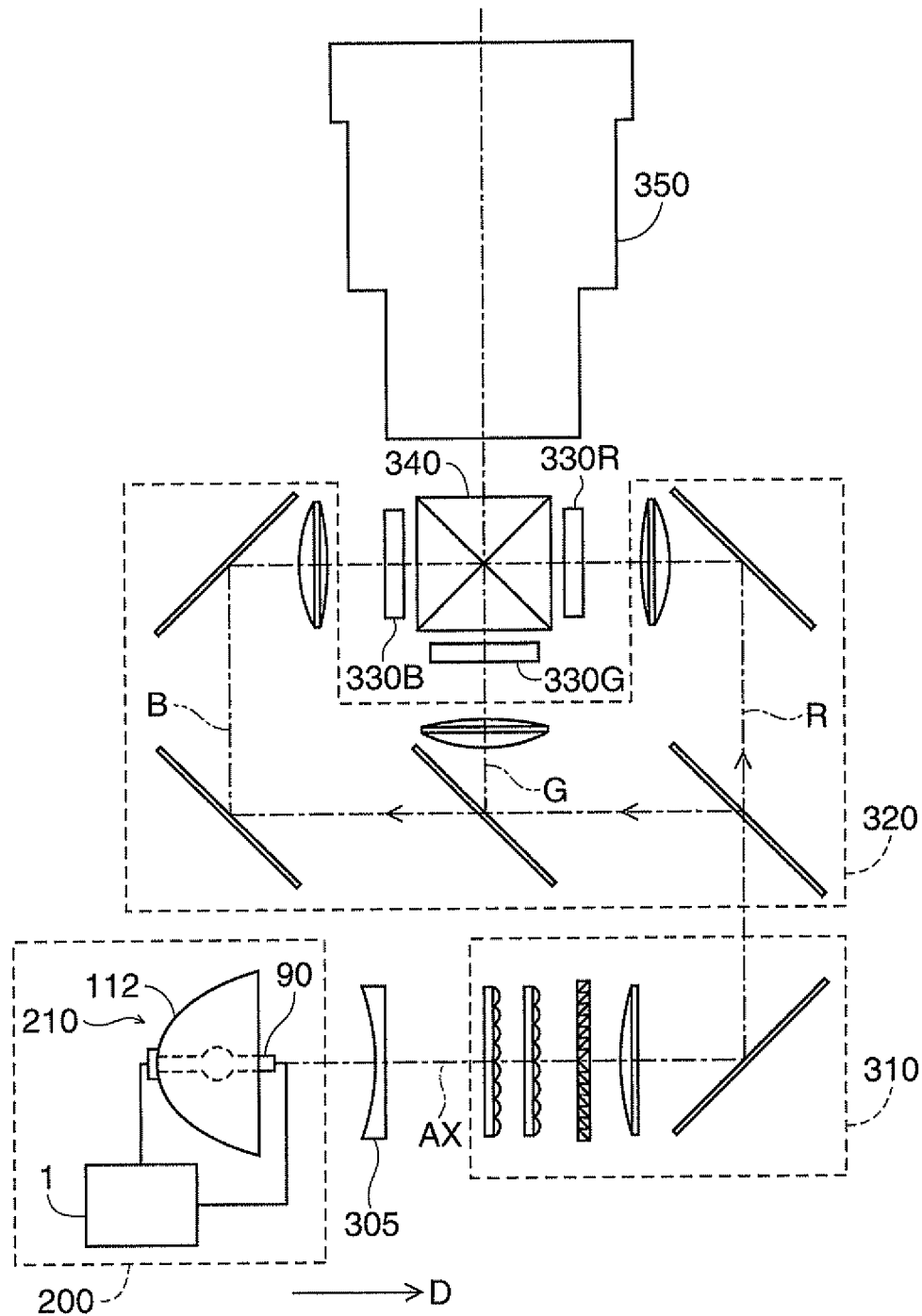
FIG. 2 is a diagram illustrating an optical system of the projector according to the present embodiment.

FIG. 2 is a diagram illustrating an optical system of the projector 500 according to the present embodiment. The projector 500 includes a light source device 200, a collimating lens 305, an illumination optical system 310, a color separation optical system 320, three liquid crystal light valves 330R, 330G and 330B, a cross dichroic prism 340, and a projection optical system 350.

The light source device 200 includes a discharge lamp lighting device 1 and a light source unit 210. The light source unit 210 includes a main reflection mirror 112, a sub reflection mirror 50 (which will be described later in detail), and a discharge lamp 90. The discharge lamp lighting device 1 supplies electric power to the discharge lamp 90 to light the discharge lamp 90. The main reflection mirror 112 reflects light emitted from the discharge lamp 90 in an irradiation direction D. The irradiation direction D is parallel to an optical axis AX. The light from the light source unit 210 passes through the collimating lens 305 and is incident on the illumination optical system 310. The collimating lens 305 collimates the light from the light source unit 210.

The illumination optical system 310 uniformizes the illuminance of the light from the light source device 200 in the liquid crystal light valves 330R, 330G and 330B. Further, the illumination optical system 310 aligns a polarization direction of the light from the light source device 200 into a single direction. This is performed to effectively use the light from the light source device 200 in the liquid crystal light valves 330R, 330G and 330B. The light in which the illuminance distribution and the polarization direction are adjusted is incident on the color separation optical system 320. The color separation optical system 320 separates the incident light into lights of three colors of red (R), green (G) and blue (B). The lights of three colors are respectively modulated by the liquid crystal light valves 330R, 330G and 330B which correspond to respective colors. The liquid crystal light valves 330R, 330G and 330B include liquid crystal panels 560R, 560G and 560B, and a polarization plate which is disposed on a light incident side and a light exiting side of each of the liquid crystal panels 560R, 560G and 560B. The modulated lights of three colors are synthesized by the cross dichroic prism 340. The synthesized light is incident on the projection optical system 350. The projection optical system 350 projects the incident light onto the screen 700. Thus, the image 710 is displayed on the screen 700.

As a configuration of each of the collimating lens 305, the illumination optical system 310, the color separation optical system 320, the cross dichroic prism 340 and the projection optical system 350, various known configurations may be employed.

Figure 3:
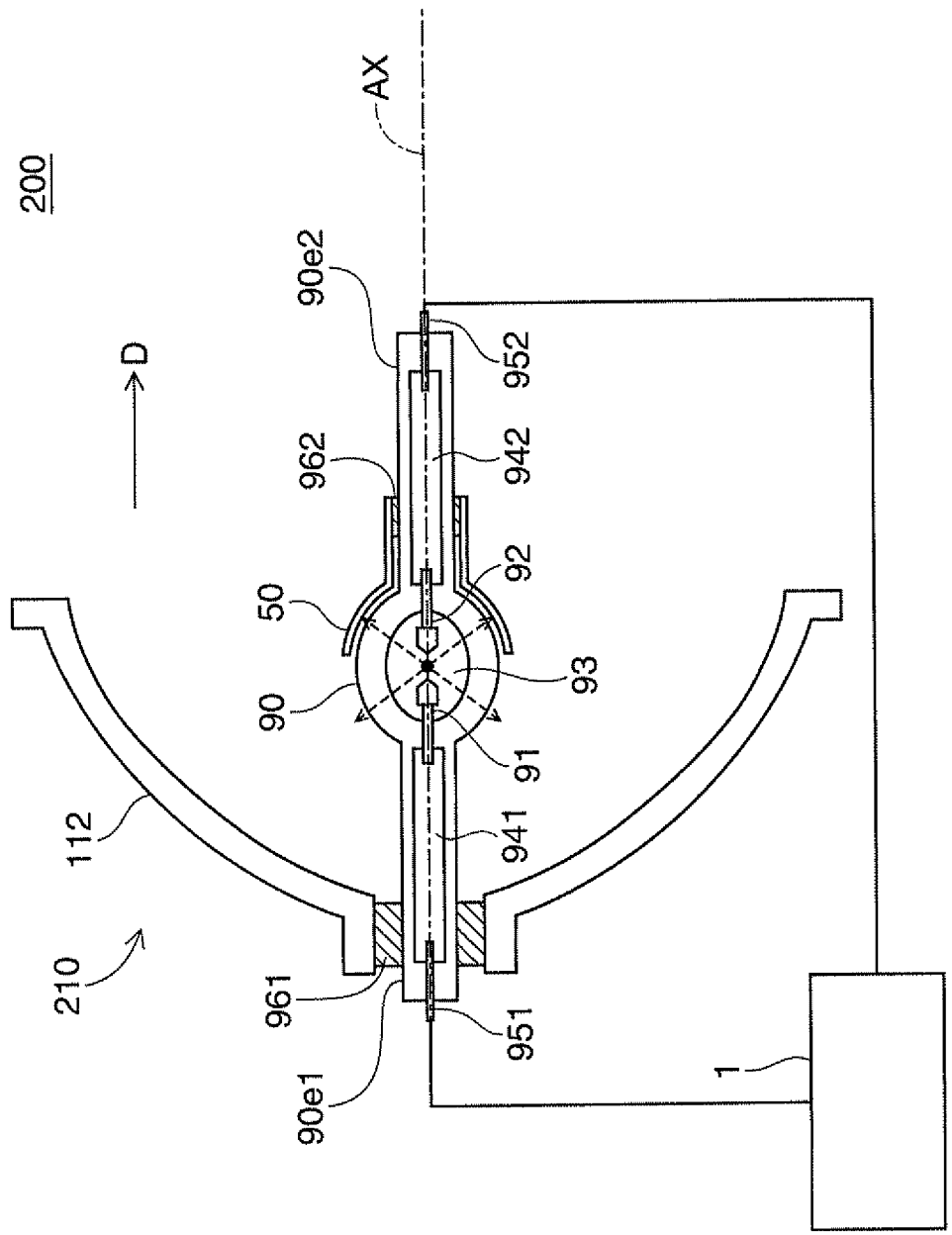
FIG. 3 is a diagram illustrating a configuration of a light source device.

FIG. 3 is a diagram illustrating a configuration of the light source device 200. The light source device 200 includes the light source unit 210 and the discharge lamp lighting device 1. In the figure, a cross-sectional view of the light source unit 210 is shown. The light source unit 210 includes the main reflection mirror 112, the sub reflection mirror 50 and the discharge lamp 90.

The shape of the discharge lamp 90 is a rod shape which extends along the irradiation direction D from a first end part 90e1 thereof to a second end part 90e2 thereof. The material of the discharge lamp 90 is a light transmissive material such as quartz glass. The central part of the discharge lamp 90 expands in a spherical shape, and a discharge space 93 is formed therein. In the discharge space 93, gas which is a discharge medium which includes a rare gas, a metal halogen compound and the like is sealed.

Further, a first electrode 91 and a second electrode 92 protrude from the discharge lamp 90 in the discharge space 93. The first electrode 91 is disposed on the side of the first end part 90e1 in the discharge space 93, and the second electrode 92 is disposed on the side of the second end part 90e2 in the discharge space 93. The shapes of the first electrode 91 and the second electrode 92 are a rod shape which extends along the optical axis AX. In the discharge space 93, an electrode tip end part (also, referred to as a "discharge end") of the first electrode 91 and an electrode tip end part of the second electrode 92 are spaced by a predetermined distance to face each other. The material of the first electrode 91 and the second electrode 92 is metal such as tungsten.

A first terminal 951 is installed in the first end part 90e1 of the discharge lamp 90. The first terminal 951 and the first electrode 91 are electrically connected to each other by a conductive member 941 which passes through the inside of the discharge lamp 90. Similarly, a second terminal 952 is installed in the second end part 90e2 of the discharge lamp 90. The second terminal 952 and the second electrode 92 are electrically connected to each other by a conductive member 942 which passes through the inside of the discharge lamp 90. The material of the first terminal 951 and the second terminal 952 is metal such as tungsten. Further, as the conductive members 941 and 942, for example, a molybdenum foil is used.

The first terminal 951 and the second terminal 952 are connected to the discharge lamp lighting device 1. The discharge lamp lighting device 1 supplies alternating current to the first terminal 951 and the second terminal 952. As a result, arc discharge occurs between the first electrode 91 and the second electrode 92. Light (discharge light) generated by the arc discharge is emitted in all directions from the discharge position as indicated by an arrow of a broken line.

The main reflection mirror 112 is fixed to the first end part 90e1 of the discharge lamp 90 by a fixing member 961. The shape of a reflection surface (surface on the side of the discharge lamp 90) of the main reflection mirror 112 is a revolving elliptical shape. The main reflection mirror 112 reflects the discharge light along the irradiation direction D. The shape of the reflection surface of the main reflection mirror 112 is not limited to the revolving elliptical shape, and various shapes which are able to reflect the discharge light in the irradiation direction D may be employed. For example, a revolving parabola shape may be employed. In this case, the main reflection mirror 112 is capable of converting the discharge light into light which is approximately parallel to the optical axis AX. Accordingly, it is possible to omit the collimating lens 305.

The sub reflection mirror 50 is fixed to the side of the second end part 90e2 of the discharge lamp 90 by a fixing member 962. The shape of a reflection surface (surface on the side of the discharge lamp 90) of the sub reflection mirror 50 is a spherical shape which surrounds the discharge space 93 on the side of the second end part 90e2. The sub reflection mirror 50 reflects the discharge light toward the main reflection mirror 112. Thus, it is possible to increase usage efficiency of the light emitted from the discharge space 93.

As the material of the fixing members 961 and 962, an arbitrary heat resistance material (for example, inorganic adhesive) which stands heat generation of the discharge lamp 90 may be employed. Further, as a method of fixing the arrangement of the main reflection mirror 112 and the sub reflection mirror 50, a method is not limited to a method of fixing the main reflection mirror 112 and the sub reflection mirror 50 to the discharge lamp 90, and an arbitrary method may be employed. For example, the discharge lamp 90 and the main reflection mirror 112 may be independently fixed to a housing (not shown) of the projector 500. This is similarly applied to the sub reflection mirror 50.

1-2. Circuit Configuration of Projector According to the Present Embodiment

Figure 4:
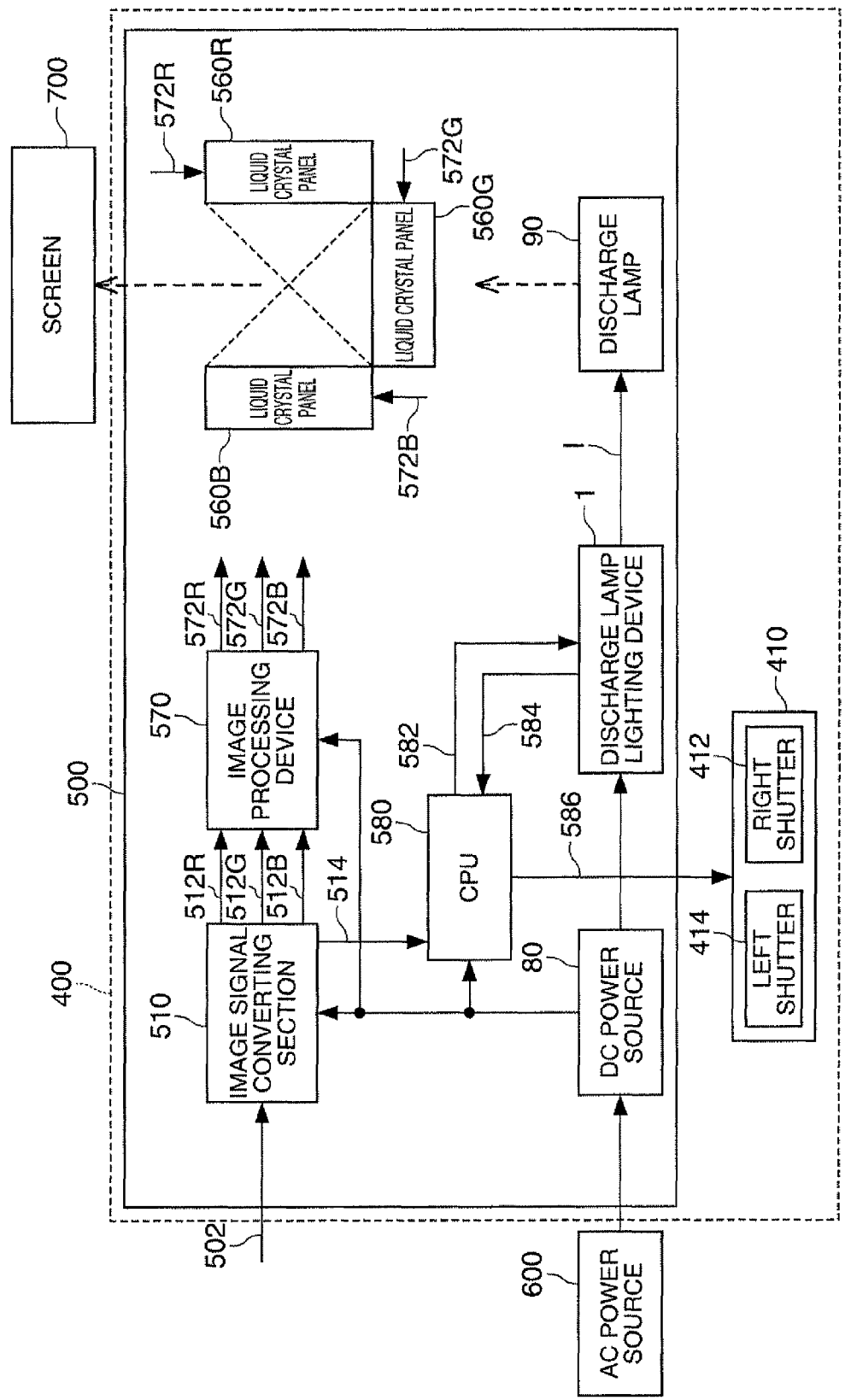
FIG. 4 is a circuit diagram illustrating a circuit configuration of the projector according to the present embodiment.

FIG. 4 is a circuit diagram illustrating a circuit configuration of the projector 500 according to the present embodiment. The projector 500 may include an image signal converting section 510, a DC power source 80, an image processing device 570, and a CPU (Central Processing unit) 580, in addition to the optical system described above. Further, the projector 500 may be configured as a projector system 400 which includes the projector 500 and active shutter glasses 410.

The image signal converting section 510 converts an image signal 502 (luminance—color difference signals, analog RGB signals and the like) input from the outside into digital RGB signals of a predetermined word length to generate image signals 512R, 512G and 512B, and then supplies the result to the image processing device 570.

The image processing device 570 performs image processing for each of three image signals 512R, 512G and 512B, and supplies drives signals 572R, 572G and 572B for respectively driving the liquid crystal panels 560R, 560G and 560B to the liquid crystal panels 560R, 560G and 560B. On the basis of the drive signals 572R, 572G and 572B input to the liquid crystal panels 560R, 560G and 560B, the image 710 is projected onto the screen 700 by the optical system described with reference to FIG. 2.

The DC power source 80 converts AC voltage supplied from an external AC power source 600 into a constant DC voltage, and supplies the DC voltage to the image signal converting section 510 which is on the secondary side of a transformer (which is not shown, but is included in the DC power source 80), the image processing device 570 and the discharge lamp lighting device 1 which is on the first side of the transformer.

The discharge lamp lighting device 1 generates high voltage between the electrodes of the discharge lamp 90 at the time of start-up and causes insulation breakdown to form a discharge path, and then, the discharge lamp 90 supplies electric current I for maintaining the discharge (drive current of the discharge lamp 90).

The liquid crystal panels 560R, 560G and 560B modulate the luminance of the color light incident on each liquid crystal panel through the optical system described above, on the basis of each of the drive signals 572R, 572G and 572B.

The CPU 580 controls an operation from the start of lighting to the extinguishing of the projector 500. For example, a lighting command or an extinguishing command may be output to the discharge lamp lighting device 1 through a communication signal 582. Further, the CPU 580 may receive lighting information indicating a lighting state of the discharge lamp 90 from the discharge lamp lighting device 1 through a communication signal 584.

Further, the CPU 580 may output a control signal 586 for controlling the active shutter glasses 410 in synchronization with the image signal 502 to the active shutter glasses 410 through a wired or wireless communication unit, on the basis of a sync signal 514 output from the image signal converting section 510.

The active shutter glasses 410 may include a right shutter 412 and a left shutter 414. The right shutter 412 and the left shutter 414 are controlled to be opened or closed on the basis of the control signal 586. In a case where a user wears the active shutter glasses 410, as the right shutter 412 is closed, a visual field on the right eye side may be blocked. Further, in a case where the user wears the active shutter glasses 410, as the left shutter 414 is closed, a visual field on the left eye side may be blocked. The right shutter 412 and the left shutter 414 may include a liquid crystal shutter, for example.

1-3. Configuration of Discharge Lamp Lighting Device

Figure 5:
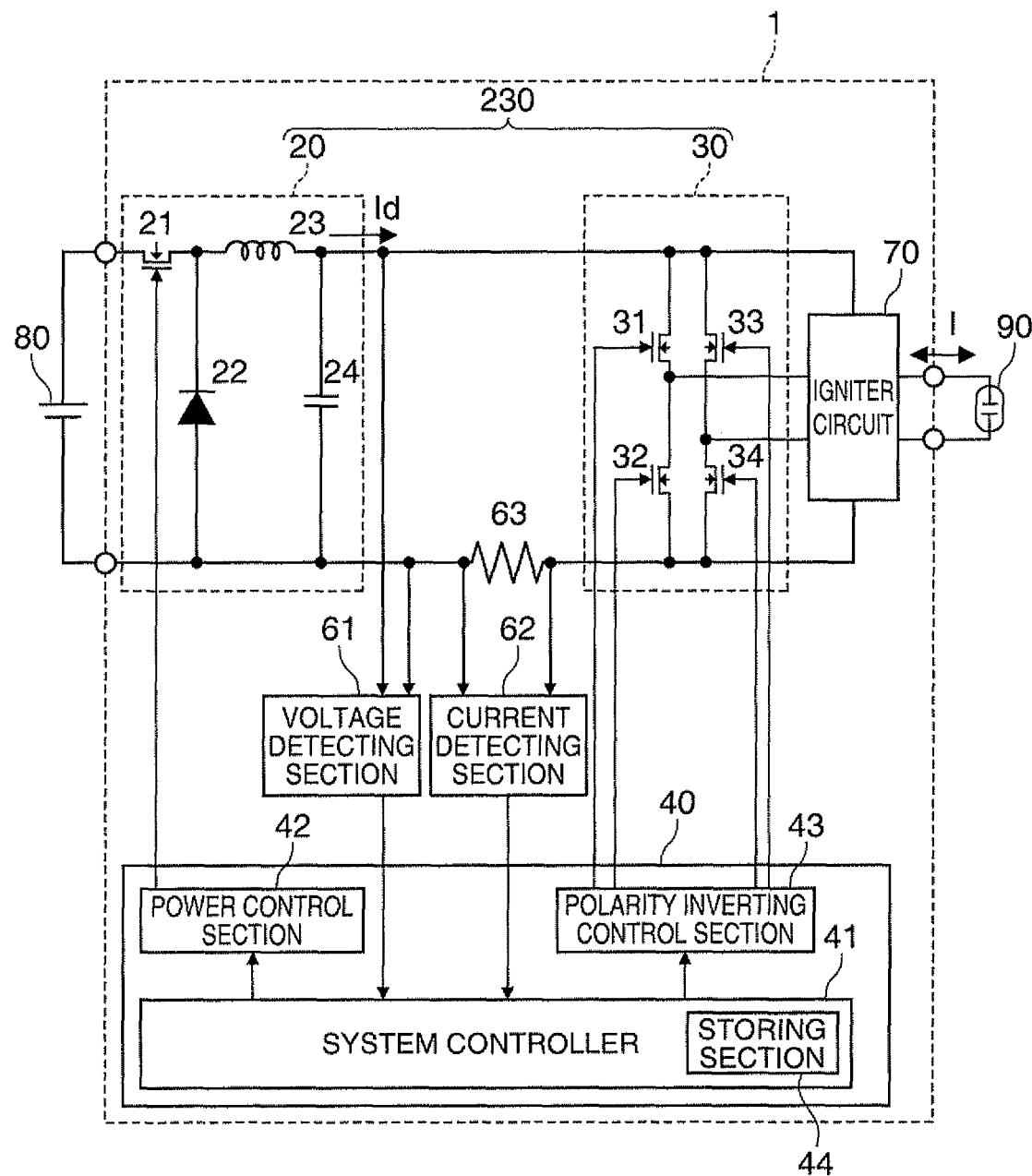
FIG. 5 is a circuit diagram illustrating a circuit configuration of a discharge lamp lighting device.

FIG. 5 is a circuit diagram illustrating a circuit configuration of the discharge lamp lighting device 1.

The discharge lamp lighting device 1 includes a power controlling circuit 20. The power controlling circuit 20 generates drive power to be supplied to the discharge lamp 90. In the present embodiment, the power controlling circuit 20 includes a down chopper circuit which lowers voltage input from the DC power source 80 and outputs direct current Id.

The power controlling circuit 20 may include a switch element 21, a diode 22, a coil 23 and a capacitor 24. The switch element 21 may include a transistor, for example. In the present embodiment, one end of the switch element 21 is connected to the positive voltage side of the DC power source 80, and the other end thereof is connected to a cathode terminal of the diode 22 and one end of the coil 23. Further, one end of the capacitor 24 is connected to the other end of the coil 23, and the other end of the capacitor 24 is connected to an anode terminal of the diode 22 and the negative voltage side of the DC power source 80. A power control signal is input to a control terminal of the switch element 21 from a control section 40 (which will be described later) to control ON/OFF of the switch element 21. A PWM (Pulse Width Modulation) control signal, for example, may be used as the power control signal.

Here, if the switch element 21 is turned on, an electric current flows in the coil 23, and energy is accumulated in the coil 23. Then, if the switch element 21 is turned off, the energy accumulated in the coil 23 is discharged from a path passing the capacitor 24 and the diode 22. As a result, the direct current Id based on the ratio to the time when the switch element 21 is turned on is generated.

The discharge lamp lighting device 1 includes a polarity inverting circuit 30. The polarity inverting circuit 30 receives the direct current Id output from the power controlling circuit 20 and performs polarity inversion at a predetermined timing to generate and output electric current I which is direct current which is continued for a controlled time or alternating current which has an arbitrary frequency. In the present embodiment, the polarity inverting circuit 30 includes an inverter bridge circuit (full bridge circuit).

The polarity inverting circuit 30 includes a first switch element 31, a second switch element 32, a third switch element 33 and a fourth switch element 34 which include a transistor or the like, and is configured by connecting the first switch element 31 and the second switch element 32 which are connected in series and the third switch element 33 and the fourth switch element 34 which are connected in series, in parallel with each other. Polarity inverting control signals are respectively input to control terminals of the first switch element 31, the second switch element 32, the third switch element 33 and the fourth switch element 34 from the control section 40, to control ON/OFF operations of the first switch element 31, the second switch element 32, the third switch element 33 and the fourth switch element 34.

By alternately repeating the ON/OFF operations of the first switch element 31 and the fourth switch element 34, and the ON/OFF operations of the second switch element 32 and the third switch element 33, the polarity inverting circuit 30 alternately inverts the polarity of the direct current Id output from the power controlling circuit 20, and generates and outputs the electric current I which is direct current which is continued for the controlled time or alternating current which has a controlled frequency, from a common connection point of the first switch element 31 and the second switch element 32 and a common connection point of the third switch element 33 and the fourth switch element 34.

That is, when the first switch element 31 and the fourth switch element 34 are turned on, the second switch element 32 and the third switch element 33 are controlled to be turned off, and when the first switch element 31 and the fourth switch element 34 are turned off, the second switch element 32 and the third switch element 33 are controlled to be turned on. Accordingly, when the first switch element 31 and the fourth switch element 34 are turned on, the electric current I which flows in the order of the first switch element 31, the discharge lamp 90 and the fourth switch element 34 from one end of the capacitor 24, is generated. Further, when the second switch element 32 and the third switch element 33 are turned on, the electric current I which flows in the order of the third switch element 33, the discharge lamp 90 and the second switch element 32 from one end of the capacitor 24, is generated.

In the present embodiment, the power controlling circuit 20 and the polarity inverting circuit 30 correspond, in combination, to a discharge lamp drive section 230. That is, the discharge lamp drive section 230 supplies the electric current I which drives the discharge lamp 90 to the discharge lamp 90. Thus, the discharge lamp drive section 230 supplies drive power to the discharge lamp 90.

The discharge lamp lighting device 1 includes the control section 40. The control section 40 controls the power controlling circuit 20 and the polarity inverting circuit 30 to control the drive power supplied to the discharge lamp 90, a holding time when the electric current I is continued with the same polarity, an electric current value and the frequency of the electric current I, and the like. The control section 40 controls the electric current value of the direct current Id output to the power controlling circuit 20, to thereby perform a current control for controlling the electric current I supplied to the discharge lamp 90. Further, according to a polarity inverting timing of the electric current I with respect to the polarity inverting circuit 30, the control section 40 performs a polarity inverting control for controlling the holding time when the electric current I is continued with the same polarity, the frequency of the electric current I, and the like.

The configuration of the control section 40 is not particularly limitative, but in the present embodiment, the control section 40 includes a system controller 41, a power control section 42 and a polarity inverting control section 43. A part or the entirety of the control section 40 may be configured by a semiconductor integrated circuit.

The system controller 41 controls the power control section 42 and the polarity inverting control section 43 to control the power controlling circuit 20 and the polarity inverting circuit 30. The system controller 41 may control the power control section 42 and the polarity inverting control section 43, on the basis of drive voltage Vla of the discharge lamp 90 detected by a voltage detecting section 61 (which will be described later) and the electric current I supplied to the discharge lamp 90 detected by a current detecting section 62 (which will be described later).

In the present embodiment, the system controller 41 includes a storing section 44. The storing section 44 may be installed independently of the system controller 41.

The system controller 41 may control the power controlling circuit 20 and the polarity inverting circuit 30, on the basis of information stored in the storing section 44. In the storing section 44, for example, information relating to drive conditions such as a holding time when the electric current I is continued with the same polarity, and an electric current value, frequency, waveform, and modulation pattern of the electric current I, may be stored.

The power control section 42 outputs a power control signal to the power controlling circuit 20 on the basis of the control signal from the system controller 41 to control the power controlling circuit 20.

The polarity inverting control section 43 outputs a polarity inverting control signal to the polarity inverting circuit 30 on the basis of the control signal from the system controller 41 to control the polarity inverting circuit 30.

The control section 40 may be realized by an exclusive circuit to perform the above-mentioned controls or various controls of processes to be described later, but for example, the CPU may function as a computer by executing a control program stored in the storing section 44 or the like to perform various controls of these processes.

Further, in an example shown in FIG. 5, the control section 40 is configured as a part of the discharge lamp lighting device 1, but the CPU 580 may perform a part or all of the functions of the control section 40.

The discharge lamp lighting device 1 includes the voltage detecting section 61. The voltage detecting section 61 detects the drive voltage Vla of the discharge lamp 90, and then outputs information about the drive voltage to the control section 40. The voltage detecting section 61 corresponds to a state detecting section in the invention. That is, the state detecting section (voltage detecting section 61) detects the drive voltage Vla as a value indicating the degree of the state of deterioration of the discharge lamp 90.

If the state of deterioration of the first electrode 91 and the second electrode 92 of the discharge lamp 90 proceeds, the distance (inter-electrode distance) between the first electrode 91 and the second electrode 92 is increased. If the inter-electrode distance is increased, the drive voltage Vla is increased. That is, the drive voltage Vla is increased as the state of deterioration of the discharge lamp 90 proceeds.

The state detecting section may detect temporal change in the drive voltage Vla of the discharge lamp 90, the amount of light of the discharge lamp 90, temporal change in the light amount of the discharge lamp 90, accumulative lighting time of the discharge lamp 90, and the like, for example, instead of the drive voltage Vla of the discharge lamp 90 or in addition to the drive voltage Vla of the discharge lamp 90, as a value indicating the degree of the state of deterioration.

The discharge lamp lighting device 1 may include the current detecting section 62. The current detecting section 62 detects the electric current I supplied to the discharge lamp 90 and outputs the drive current information to the control section 40. In the present embodiment, the current detecting section 62 detects voltage generated in a resistor 63 which is connected in series to the discharge lamp 90, to detect the electric current I supplied to the discharge lamp 90.

Further, the voltage detecting section 61 and the current detecting section 62 may be respectively realized by an exclusive circuit to perform the above-described detection, but for example, the CPU may also function as a computer by executing a control program stored in a storing section (not shown) or the like to perform the above-described detection.

Further, the control section 40, and the voltage detecting section 61 and the current detecting section 62 may be independently configured, or may be integrally configured by one CPU.

The discharge lamp lighting device 1 may include an igniter circuit 70. The igniter circuit 70 is operated only when the discharge lamp 90 starts lighting, and causes insulation-breakdown between the electrodes (between the first electrode 91 and the second electrode 92) of the discharge lamp 90 when the discharge lamp 90 starts lighting and supplies a high voltage (voltage higher than voltage when the discharge lamp 90 is normally lighted) necessary for forming a discharge path between the electrodes (between the first electrode 91 and the second electrode 92) of the discharge lamp 90. In the present embodiment, the igniter circuit 70 is connected to the discharge lamp 90 in parallel.

Figure 6A:
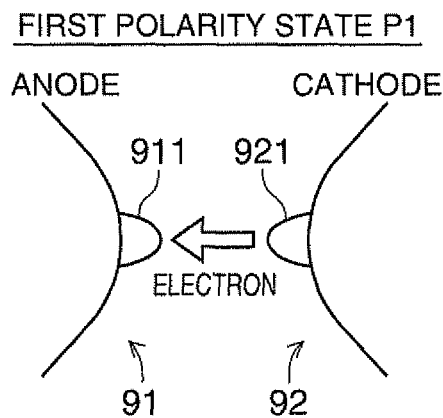
FIGS. 6A to 6D are diagrams illustrating the relationship between the polarity of an electric current supplied to a discharge lamp and the temperature of an electrode.
Figure 6B:
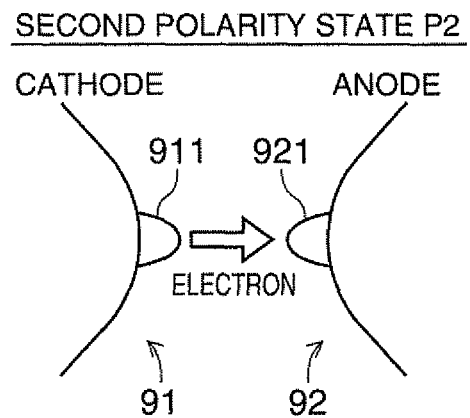

1-4. Relationship Between Polarity of Drive Current and Temperature of Electrode FIGS. 6A to 6D are diagrams illustrating the relationship between the polarity of the electric current I supplied to the discharge lamp 90 and the temperature of the electrode. FIGS. 6A and 6B show operation states of the first electrode 91 and the second electrode 92. In the figure, the tip end parts of the first electrode 91 and the second electrode 92 are shown. Protrusions 911 and 921 are respectively formed at the tip ends of the first electrode 91 and the second electrode 92. Discharge occurring between the first electrode 91 and the second electrode 92 mainly occurs between the protrusion 911 and the protrusion 921. In the examples shown in FIGS. 6A and 6B, compared with a case where the protrusions are not formed, it is possible to prevent movement of the discharge position (arc position) in the first electrode 91 and the second electrode 92. However, such a protrusion may be omitted.

FIG. 6A shows a first polarity state P1 in which the first electrode 91 is operated as the anode and the second electrode 92 is operated as the cathode. In the first polarity state P1, electrons move to the first electrode 91 (anode) from the second electrode 92 (cathode) by discharge. The electrons are discharged from the cathode (second electrode 92). The electrons discharged from the cathode (second electrode 92) collide with the tip end of the anode (first electrode 91). Heat is generated by the collision, and thus, the temperature of the tip end (protrusion 911) of the anode (first electrode 91) is increased.

FIG. 6B shows a second polarity state P2 in which the first electrode 91 is operated as the cathode and the second electrode 92 is operated as the anode. In the second polarity state P2, contrary to the first polarity state P1, electrons move to the second electrode 92 from the first electrode 91. As a result, the temperature of the tip end (protrusion 921) of the second electrode 92 is increased.

In this way, the temperature of the anode is easily increased compared with the cathode. Here, a state in which the temperature of one electrode is higher than the temperature of the other electrode (a state in which the temperature of the other electrode is lower than the temperature of one electrode) is continued may cause various problems. For example, in a case where the tip end of the high temperature electrode is excessively melted, unexpected electrode deformation may occur. As a result, the length of arc may be deviated from an appropriate value. Further, for example, in a case where the tip end of the low temperature electrode is insufficiently melted, minute concaves and convexes generated at the tip end may remain without being melted. Consequently, a so-called arc jump may occur (arc position moves without stability).

Figure 6C:
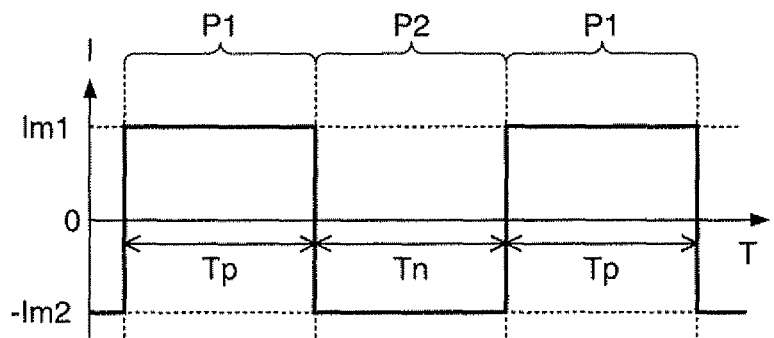

As a technology of suppressing such a problem, an AC driving which supplies alternating current in which the polarity of each electrode is repeatedly switched to the discharge lamp 90 as the electric current I, may be used. FIG. 6C is a timing chart illustrating an example of the electric current I supplied to the discharge lamp 90. The horizontal axis represents time T, and the vertical axis represents an electric current value of the electric current I. The electric current I shows an electric current which flows in the discharge lamp 90. A positive value represents the first polarity state P1, and a negative value represents the second polarity state P2. In the example shown in FIG. 6C, square wave alternating current is used as the electric current I. Further, in the example shown in FIG. 6C, the first polarity state P1 and the second polarity state P2 are alternately repeated. Here, a first polarity segment Tp represents the time when the first polarity state P1 is continued, and a second polarity segment Tn represents the time when the second polarity state P2 is continued. Further, in the example shown in FIG. 6C, an average current value of the first polarity segment Tp is Im1, and an average current value of the second polarity segment Tn is −Im2. Further, the frequency of the electric current I suitable for the driving of the discharge lamp 90 may be experimentally determined according to characteristics of the discharge lamp 90 (for example, a value in the range of 30 Hz to 1 kHz is used). The other values Im1, −Im2, Tp and Tn may be similarly experimentally determined.

Figure 6D:
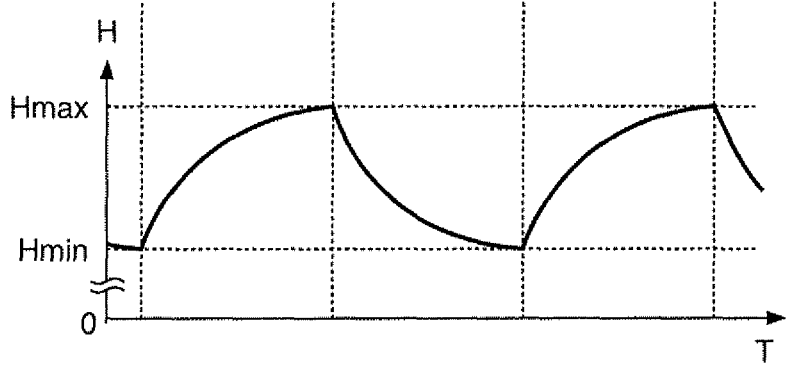

FIG. 6D is a timing chart illustrating temperature change of the first electrode 91. The horizontal axis represents time T, and the vertical axis represents temperature H. In the first polarity state P1, the temperature H of the first electrode 91 is increased, and in the second polarity state P2, the temperature H of the first electrode 91 is decreased. Further, since the first polarity state P1 and the second polarity state P2 are repeated, the temperature H is periodically changed between a minimum value Hmin and a maximum value Hmax. Although not shown, the temperature of the second electrode 92 is changed in a phase opposite to the temperature H of the first electrode 91. That is, in the first polarity state P1, the temperature of the second electrode 92 is decreased, and in the second polarity state P2, the temperature of the second electrode 92 is increased.

In the first polarity state P1, since the tip end of the first electrode 91 (protrusion 911) is melted, the tip end of the first electrode 91 (protrusion 911) becomes smooth. Thus, it is possible to suppress movement of the discharge position in the first electrode 91. Further, since the temperature of the tip end of the second electrode 92 (protrusion 921) is decreased, excessive melting of the second electrode 92 (protrusion 921) is suppressed. Thus, it is possible to suppress unintentional electrode deformation. In the second polarity state P2, the roles of the first electrode 91 and the second electrode 92 are reversed. Accordingly, by repeating the first polarity state P1 and the second polarity state P2, it is possible to suppress the problem in each of the first electrode 91 and the second electrode 92.

Here, in a case where the waveform of the electric current I is symmetric, that is, the waveform of the electric current I satisfies a condition that "|Im1|=|−Im2| and Tp=Tn", conditions of the supplied power are the same between the first electrode 91 and the second electrode 92. Accordingly, it is inferred that, if thermal conditions (the ease with which temperature is increased or decreased) of the first electrode 91 and the second electrode 92 are the same, a temperature difference between the first electrode 91 and the second electrode 92 is reduced.

Further, if the electrode is excessively heated over a wide range (arc spot (hot spot on the electrode surface according to arc discharge) becomes large), the shape of the electrode is deformed by the excessive melting. Contrarily, if the electrode becomes too cold, the tip end of the electrode may not be sufficiently melted, and the tip end hardly returns to smooth, that is, the tip end of the electrode is easily deformed.

1-5. Control Example of Drive Current According to the Present Embodiment

Next, a specific example of the control of the electric current I in the projector 500 according to the present embodiment will be described.

1-5-1. First Period, Second Period and Switching Timing

Figure 7:
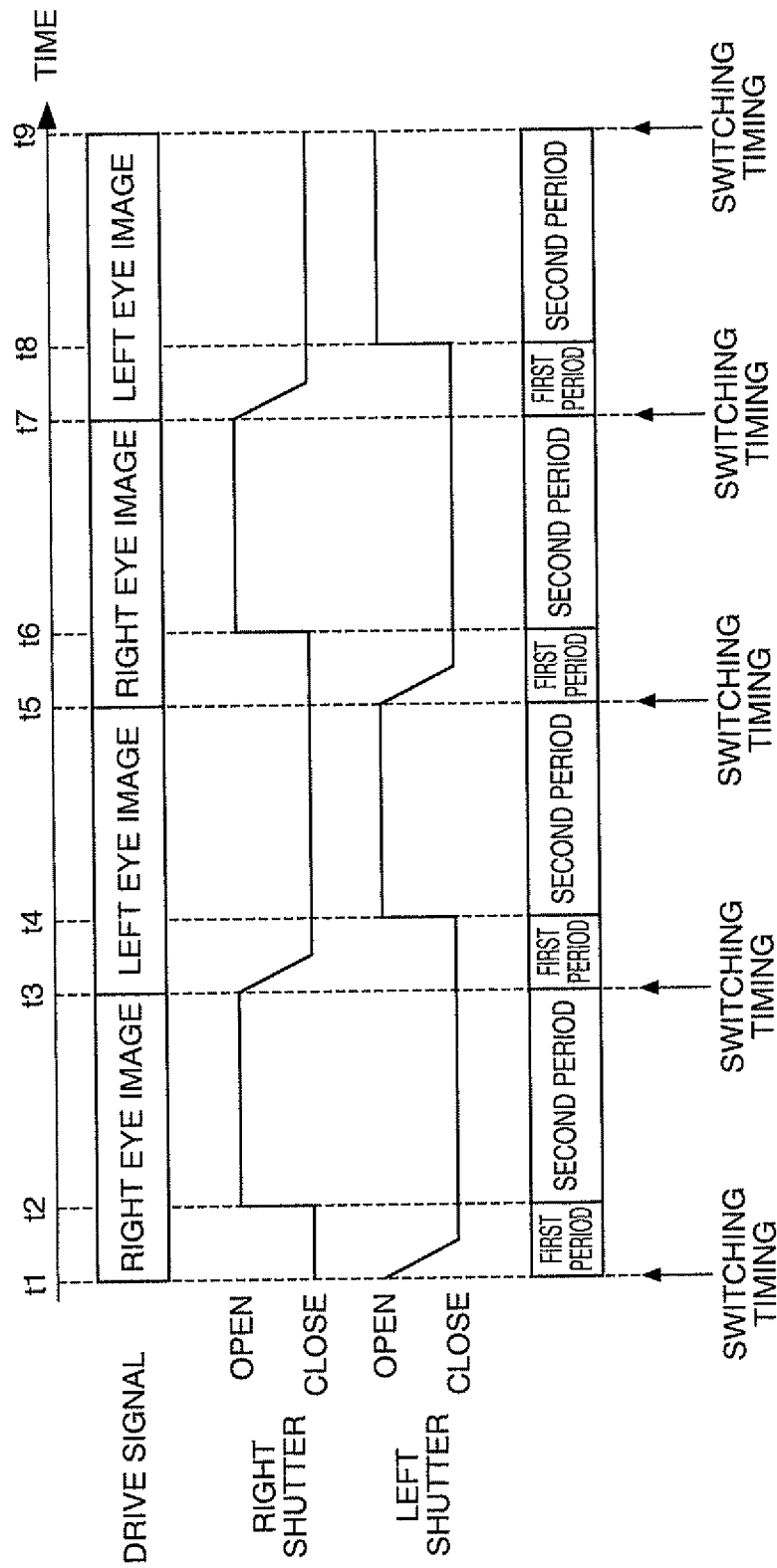
FIG. 7 is a diagram illustrating a first period, a second period and a switching timing.

FIG. 7 is a diagram illustrating a first period, a second period and a switching timing. In FIG. 7, content of the drive signals 572R, 572G and 572B, the opened and closed state of the right shutter 412, the opened and closed state of the left shutter 414, and the temporal relationship between the first period, the second period and the switching timing are shown sequentially from the top. The horizontal axis represents time in FIG. 7. Hereinafter, an example in which an observer stereoscopically views a display image using a first image and a second image as a left eye image and a right eye image, respectively, will be described.

In the example shown in FIG. 7, the drive signals 572R, 572G and 572B are drive signals corresponding to the right eye image as the first image from a time t1 to a time t3, the left eye image as the second image from the time t3 to a time t5, the right eye image as the first image from the time t5 to a time t7, and the left eye image as the second image from the time t7 to a time t9. Accordingly, in the example shown in FIG. 7, the projector 500 switches and alternately outputs the right eye image as the first image and the left eye image as the second image, using the time t1, the time t3, the time t5, the time t7 and the time t9 as switching timings.

A period interposed between the switching timings which are temporally adjacent to each other starts in the first period and ends in the second period. In the example shown in FIG. 7, for example, a period interposed between the time t1 and the time t3 which are the switching timings starts in a first period from the time t1 to the time t2 and ends in a second period from the time t2 to the time t3. This is similarly applied to a period interposed between the time t3 and the time t5 which are the switching timings, a period interposed between the time t5 and the time t7 which are the switching timings, and a period interposed between the time t7 and the time t9 which are the switching timings. Further, in the example shown in FIG. 7, a case where the length of the first period is longer than the length of the second period is shown. For example, the length of the first period:the length of the second period may be 1:3. Here, the length of the first period and the length of the second period may be set respectively appropriately as necessary. Further, in addition to the first period and the second period, a third period may be present. In the third period, a control different from the control of the electric current I in the first period and the second period (which will be described later) may be performed.

The right shutter 412 enters the opened state in at least a part of the period when the drive signals 572R, 572G and 572B corresponding to the right eye image as the first image are input to the liquid crystal panels 560R, 560G and 560B. In the example shown in FIG. 7, the right shutter 412 is in the closed state from the time t1 to the time t2, and then, is in the opened state from the time t2 to the time t3. Further, in the example shown in FIG. 7, in at least a part of the period when the drive signals 572R, 572G and 572B corresponding to the left eye image as the second image are input to the liquid crystal panels 560R, 560G and 560B, the right shutter 412 starts to be closed from the time t3, is completely closed between the time t3 and the time t4, and then, is in the closed state from the time t4 to the time t5. The change in the opened and closed states of the right shutter 412 between the time t5 and the time t9 is the same as the change in the opened and closed states between the time t1 and the time t5.

The left shutter 414 enters the opened state in at least a part of the period when the drive signals 572R, 572G and 572B corresponding to the left eye image as the second image are input to the liquid crystal panels 560R, 560G and 560B. In the example shown in FIG. 7, the left shutter 414 is in the closed state from the time t3 to the time t4, and then, is in the opened state from the time t4 to the time t5. Further, in the example shown in FIG. 7, in at least apart of the period when the drive signals 572R, 572G and 572B corresponding to the right eye image as the first image are input to the liquid crystal panels 560R, 560G and 560B, the left shutter 414 starts to be closed from the time t1, is completely closed between the time t1 and the time t2, and then, is in the closed state from the time t2 to the time t3. The change in the opened and closed states of the left shutter 414 between the time t5 and the time t9 is the same as the change in the opened and closed states between the time t1 and the time t5.

Further, in the example shown in FIG. 7, in the period when the drive signals 572R, 572G and 572B corresponding to the right eye image as the first image are input to the liquid crystal panels 560R, 560G and 560B, the period when the right shutter 412 is closed corresponds to the first period, and the period when the right shutter 412 is opened corresponds to the second period. Further, in the example shown in FIG. 7, in the period when the drive signals 572R, 572G and 572B corresponding to the left eye image as the second image are input to the liquid crystal panels 560R, 560G and 560B, the period when the left shutter 414 is closed corresponds to the first period, and the period when the left shutter 414 is opened corresponds to the second period. Further, in the example shown in FIG. 7, in the first period, a period when all of the right shutter 412 and the left shutter 414 are closed is present.

1-5-2. First Control, Second Control and Third Control

The control section 40 of the projector 500 according to the present embodiment controls a discharge lamp drive section 230 so that the absolute value of the electric current I is relatively small in the first period and is relatively large in the second period compared with the first period.

Further, in the second period, the control section 40 of the projector 500 according to the present embodiment performs any one of a first control for controlling the discharge lamp drive section 230 to supply alternating current to the discharge lamp 90 as the electric current I, a second control for controlling the discharge lamp drive section 230 to supply, to the discharge lamp 90, the electric current I in which the maximum value of the time when the first polarity in which the first electrode 91 becomes the anode is continued is longer than the maximum value of the time when the first polarity is continued in the first control, and a third control for controlling the discharge lamp drive section 230 to supply, to the discharge lamp 90, the electric current I in which the maximum value of the time when the second polarity in which the second electrode 92 becomes the anode is continued is longer than the maximum value of the time when the second polarity is continued in the first control.

Figure 8A:
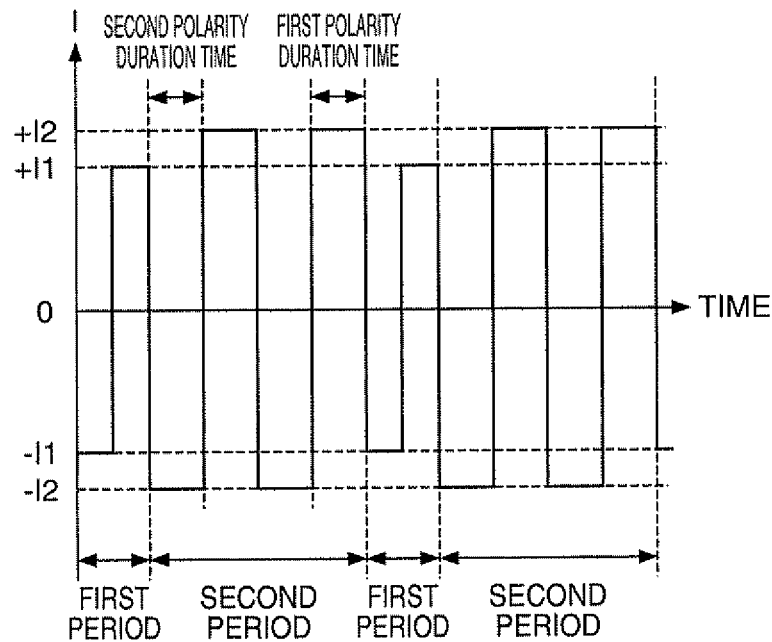
FIG. 8A is a timing chart illustrating a waveform example of an electric current in a case where a first control is performed in the second period.
Figure 8B:
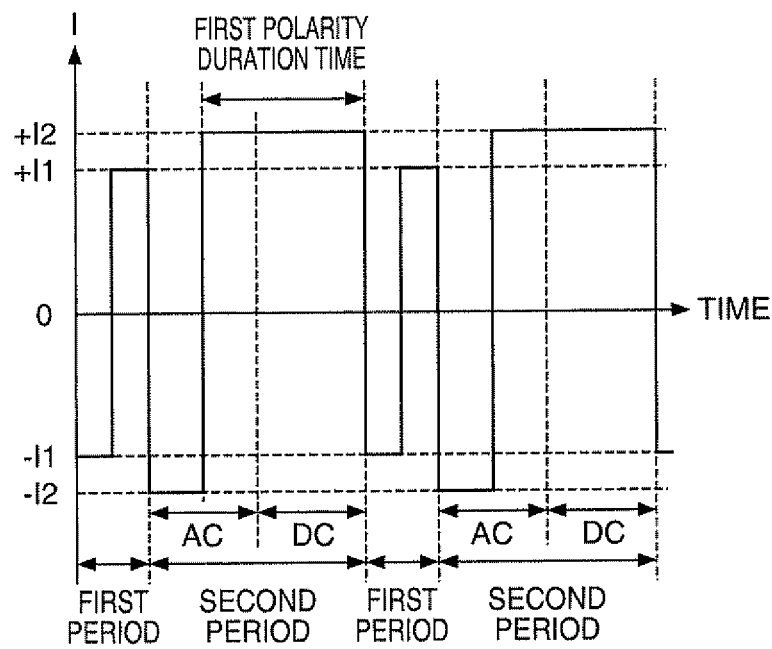
FIG. 8B is a timing chart illustrating a waveform example of an electric current in a case where a second control is performed in the second period.
Figure 8C:
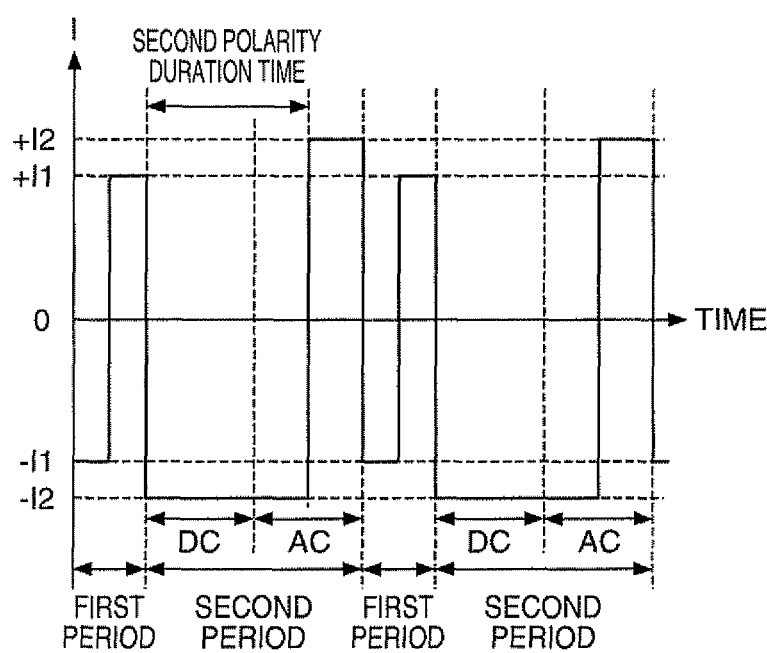
FIG. 8C is a timing chart illustrating a waveform example of an electric current in a case where a third control is performed in the second period.

FIG. 8A is a timing chart illustrating a waveform example of the electric current I in a case where the first control is performed in the second period, FIG. 8B is a timing chart illustrating a waveform example of the electric current I in a case where the second control is performed in the second period, and FIG. 8C is a timing chart illustrating a waveform example of the electric current I in a case where the third control is performed in the second period. The horizontal axis in FIGS. 8A to 8C represents time, and the vertical axis thereof represents an electric current value of the electric current I. Further, the electric current I in the case of the first polarity in which the first electrode 91 becomes the anode is represented as positive, and the electric current I in the case of the second polarity in which the second electrode 92 becomes the anode is represented as negative.

In the examples shown in FIGS. 8A to 8C, the absolute value of the electric current I is relatively small in the first period and is relatively large in the second period compared with the first period. Thus, without increasing average power over the first period and the second period, it is possible to increase the electric current I in the second period which is a period when an image is shown to the observer. Accordingly, it is possible to realize a projector 500 capable of projecting an image to appear bright.

In the examples shown in FIGS. 8A to 8C, the electric current I in the first period is square wave alternating current. The frequency of the electric current I in the first period may be experimentally determined according to specification of the discharge lamp 90. In the examples shown in FIGS. 8A to 8C, the electric current I in the first period includes one cycle of alternating current which starts in the second polarity and ends in the first polarity.

In the first period, since the absolute value of the electric current value of the electric current I is smaller than that in the second period, the electrode temperature of the discharge lamp 90 is easily decreased compared with the second period. Accordingly, the control section 40 controls the discharge lamp drive section 230 in the first period so as to supply the alternating current to the discharge lamp 90 as the electric current I, to thereby reduce the duration time when one electrode becomes the cathode (electrode which easily becomes lower in temperature) and to suppress deformation of the electrode.

In the example shown in FIG. 8A, the electric current I in the second period when the first control is performed is square wave alternating current. The frequency of the electric current I in the first control may be experimentally determined according to specification of the discharge lamp 90. In the example shown in FIG. 8A, the electric current I in the second period when the first control is performed includes two cycles of alternating current which starts in the second polarity and ends in the first polarity. In the first control, the maximum value of the time when the first polarity is continued is 0.5 cycle of alternating current, and the maximum value of the time when the second polarity shown in FIG. 8A is continued is 0.5 cycle of alternating current.

In the example shown in FIG. 8B, the electric current I in the second period when the second control is performed includes square wave alternating current and direct current after the square wave alternating current. The duration time of the direct current and the frequency of the alternating current in the second control may be experimentally determined according to specification of the discharge lamp 90. For example, in a case where the state of deterioration of the discharge lamp 90 proceeds, it is possible to set the highest frequency of the electric current I to 400 Hz or higher and 600 Hz or lower. In the example shown in FIG. 8B, the electric current I in the second period when the second control is performed includes one cycle of alternating current which starts in the second polarity and ends in the first polarity, and the direct current of the first polarity. In the second control shown in FIG. 8B, the maximum value of the time when the first polarity is continued is the sum of 0.5 cycle of alternating current and the time when the direct current is continued. That is, in the second control shown in FIG. 8B, the electric current I in which the maximum value of the time when the first polarity is continued is longer than the maximum value of the time when the first polarity is continued in the first control, is supplied to the discharge lamp 90.

In the example shown in FIG. 8C, the electric current I in the second period when the third control is performed includes direct current and square wave alternating current after the direct current. The duration time of the direct current and the frequency of the alternating current in the third control may be experimentally determined according to specification of the discharge lamp 90. For example, in a case where the state of deterioration of the discharge lamp 90 proceeds, it is possible to set the highest frequency of the electric current I to 400 Hz or higher and 600 Hz or lower. In the example shown in FIG. 8C, the electric current I in the second period when the third control is performed includes the direct current of the second polarity and one cycle of the alternating current which starts in the second polarity and ends in the first polarity. In the third control shown in FIG. 8C, the maximum value of the time when the second polarity is continued is the sum of the time when the direct current is continued and 0.5 cycle of alternating current. That is, in the second control shown in FIG. 8C, the electric current I in which the maximum value of the time when the second polarity is continued is longer than the maximum value of the time when the second polarity is continued in the first control, is supplied to the discharge lamp 90.

1-5-3. First Specific Example of Control Based on State of Deterioration of Discharge Lamp In a first specific example of the control based on the state of deterioration of the discharge lamp 90, the control section 40 reduces at least one of the maximum value of the time when the first polarity is continued in the second period and the maximum value of the time when the second polarity is continued in the third control, as the state of deterioration of the discharge lamp 90 proceeds.

Figure 9:
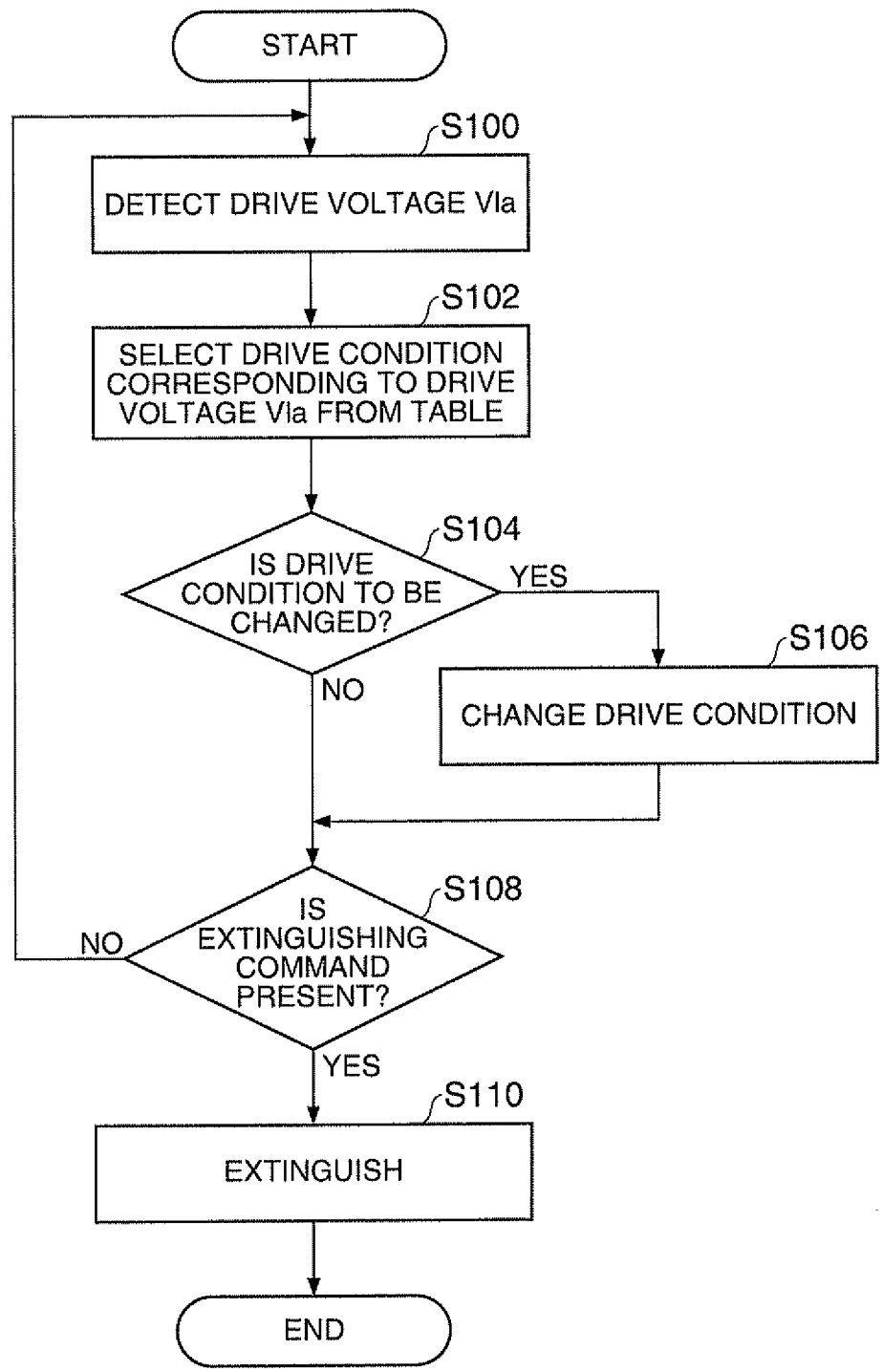
FIG. 9 is a flowchart illustrating a control example of the projector according to the present embodiment.

FIG. 9 is a flowchart illustrating a control example of the projector 500 according to the present embodiment. In the flowchart shown in FIG. 9, a control from the time when the discharge lamp 90 is stably lighted to the time of light-out thereof is shown.

Firstly, the voltage detecting section 61 detects the drive voltage Vla (step S100). Then, the control section 40 selects drive conditions corresponding to the drive voltage Vla detected in step S100 from a table stored in the storing section 44 (step S102).

FIG. 10 is a table illustrating drive conditions in the first specific example. In an example shown in FIG. 10, four types of drive conditions are stored in the storing section 44 according to the drive voltage Vla. In the example shown in FIG. 10, a "first polarity or second polarity duration time" means a "first polarity duration time" with respect to the second control, and means a "second polarity duration time" with respect to the third control. Further, in the first specific example, as described above with reference to FIGS. 8B and 8C, the "first polarity duration time" and the "second polarity duration time" are the total value of the DC time and the length of 0.5 cycle in the AC frequency.

Further, in the example shown in FIG. 10, "the number of times" represents how many times the first control, the second control and the third control are continuously performed in the second period. Further, in the first specific example, the first control, the second control, the first control and the third control are sequentially repeated as one set. That is, in the example shown in FIG. 10, the first control is repeated 2000 times, the second control 50 times, the first control 2000 times and the third control 50 times, which are sequentially repeated as one set. Normally, since it is preferable that accumulative values of energy given to the first electrode 91 and the second electrode 92 as the electric current I is supplied to the discharge lamp 90 be approximately the same, in a case where the electric current I has the waveforms shown in FIGS. 8B and 8C, it is preferable that the number of times of the second control and the number of times of the third control be approximately the same.

In the example shown in FIG. 10, as the drive voltage Vla is increased (that is, as the state of deterioration of the discharge lamp 90 proceeds), all of the maximum value of the time when the first polarity is continued in the second control and the maximum value of the time when the second polarity is continued in the third control are decreased.

The table of the drive conditions may be configured so that only any one of the maximum value of the time when the first polarity is continued in the second control and the maximum value of the time when the second polarity is continued in the third control is decreased.

After selection of the drive conditions in step S102 of FIG. 9, the control section 40 determines whether it is necessary to change the drive conditions (step S104). In a case where it is determined that it is necessary to change the drive condition (Yes of step S104), the control section 40 changes the drive conditions into the drive conditions selected in step S102 and drives the discharge lamp 90 (step S106). In a case where it is determined that it is not necessary to change the drive conditions (No of step S104), the control section 40 continuously drive the discharge lamp 90 according to the previous drive conditions.

In the case of No in step S104 and after step S106, the control section 40 determines whether an extinguishing command of the discharge lamp 90 is present (step S108). In a case where it is determined that the extinguishing command is present (Yes of step S108), the control section 40 terminates the lighting of (extinguishment) the discharge lamp 90. In a case where it is determined that the extinguishing command is not present (No of step S108), the control section 40 repeats the control of step S100 to step S108 until the extinguishing command is present.

If the state of deterioration of the discharge lamp 90 proceeds, the meltability of the electrode of the discharge lamp 90 is decreased, and the electrode of the discharge lamp 90 may be deformed. According to the first specific example of the present embodiment, as the state of deterioration of the discharge lamp 90 proceeds, at least one of the maximum value of the time when the first polarity is continued in the second control and the maximum value of the time when the second polarity is continued in the third control is decreased, and thus, it is possible to shorten the time when a state where one electrode of the discharge lamp 90 becomes the cathode is continued. Thus, it is possible to suppress positively charged particles such as metallic ions in a discharge space 93 of the discharge lamp 90 from colliding with the electrode, in a state where the temperature of the electrode is low. Accordingly, it is possible to suppress deformation of the electrode of the discharge lamp 90.

In the first specific example, as the state of deterioration of the discharge lamp 90 proceeds, the control section 40 may increase the frequency in the first control. In the example shown in FIG. 10, as the drive voltage Vla is increased (that is, as the state of deterioration of the discharge lamp 90 proceeds), the frequency in the first control is increased.

If the state of deterioration of the discharge lamp 90 proceeds, the position of a discharge starting point is not stabilized. Accordingly, as the state of deterioration of the discharge lamp 90 proceeds, by increasing the frequency in the first control to decrease the arc spot, it is possible to stabilize the discharge starting point.

In the first specific example, the length of the second period may be longer than the length of the first period. As described above with reference to FIG. 7 and FIGS. 8A to 8C, in the first specific example, the length of the second period is longer than the length of the first period.

As the length of the second period becomes long, the influence on the discharge lamp 90 becomes large as a state where the temperature of the electrode is low is continued in the second period. Thus, in a case where the length of the second period is longer than the length of the first period, the effect of suppressing deformation of the electrode of the discharge lamp 90 becomes large.

1-5-4. Second Specific Example of Control Based on State of Deterioration of Discharge Lamp In a second specific example of the control based on the state of deterioration of the discharge lamp 90, as the state of deterioration of the discharge lamp 90 proceeds, the control section 40 reduces the ratio of the total value of the time when the second control and the third control are performed to the total value of the time when the first control, the second control and the third control are performed.

The first specific example and the second specific example are the same in the flowchart of the control from the time when the discharge lamp 90 is stably lighted to the time of extinguishment thereof, as described with reference to FIG. 9, and are different from each other in the table of the drive conditions used in step S102. Accordingly, hereinafter, the table of the drive conditions used in step S102 will be mainly described.

FIG. 11 is a table illustrating drive conditions in the second specific example. In the example shown in FIG. 11, four types of drive conditions are stored in the storing section 44 according to the drive voltage Vla. In the example shown in FIG. 11, "the number of times" represents how many times the first control, the second control and the third control are continuously performed in the second period. Further, in the second specific example, the first control, the second control, the first control and the third control are sequentially repeated as one set. Normally, since it is preferable that accumulative values of energy given to the first electrode 91 and the second electrode 92 as the electric current I is supplied to the discharge lamp 90 be approximately the same, in a case where the electric current I has the waveforms shown in FIGS. 8B and 8C, it is preferable that the number of times of the second control and the number of times of the third control be approximately the same.

In the example shown in FIG. 11, "the ratio of the second control and the third control" means "the ratio of the total value of the time when the second control and the third control are performed to the total value of the time when the first control, the second control and the third control are performed".

In the example shown in FIG. 11, as the drive voltage Vla is increased (that is, as the state of deterioration of the discharge lamp 90 proceeds), the ratio of the total value of the time when the second control and the third control are performed to the total value of the time when the first control, the second control and the third control are performed is decreased.

If the state of deterioration of the discharge lamp 90 proceeds, the meltability of the electrode of the discharge lamp 90 is decreased, and the electrode of the discharge lamp 90 may be deformed. According to the first specific example of the present embodiment, as the state of deterioration of the discharge lamp 90 proceeds, the ratio of the total value of the time when the second control and the third control are performed to the total value of the time when the first control, the second control and the third control are performed is decreased, and thus, it is possible to reduce the ratio of the time when a state where one electrode of the discharge lamp 90 becomes the cathode is continued to the lighting time of the discharge lamp 90. Accordingly, it is possible to suppress positively charged particles such as metallic ions from colliding with the electrode in a state where the temperature of the electrode of the discharge lamp 90 is low. Accordingly, it is possible to suppress deformation of the electrode of the discharge lamp 90.

In the second specific example, as the state of deterioration of the discharge lamp 90 proceeds, the control section 40 may increase the frequency in the first control.

If the state of deterioration of the discharge lamp 90 proceeds, the position of the discharge starting point is not stabilized. Accordingly, as the state of deterioration of the discharge lamp 90 proceeds, by increasing the frequency in the first control to decrease the arc spot on the electrode of the discharge lamp 90, it is possible to stabilize the discharge starting point.

In the second specific example, the length of the second period may be longer than the length of the first period. As described above with reference to FIG. 7 and FIGS. 8A to 8C, in the first specific example, the length of the second period is longer than the length of the first period.

As the length of the second period becomes long, the influence on the discharge lamp 90 becomes large as a state where the temperature of the electrode is low is continued in the second period. Thus, in a case where the length of the second period is longer than the length of the first period, the effect of suppressing deformation of the electrode of the discharge lamp 90 becomes large.

1-5-5. Third Specific Example of Control Based on State of Deterioration of Discharge Lamp In a third specific example of the control based on the state of deterioration of the discharge lamp 90, the control section 40 may include, as the first control, a case of performing a first AC control for controlling the discharge lamp drive section 230 to supply alternating current of a first frequency as the electric current I to the discharge lamp 90, and a case of performing a second AC control for controlling the discharge lamp drive section 230 to supply alternating current of a second frequency different from the first frequency as the electric current I to the discharge lamp 90.

The first specific example and the third specific example are the same in the flowchart of the control from the time when the discharge lamp 90 is stably lighted to the time of extinguishment thereof, as described with reference to FIG. 9, and are different from each other in the table of the drive conditions used in step S102. Accordingly, hereinafter, the table of the drive conditions used in step S102 will be mainly described.

FIG. 12 is a table illustrating a drive conditions in the third specific example. In an example shown in FIG. 12, four types of drive conditions are stored in the storing section 44 according to the drive voltage Vla. In the example shown in FIG. 12, "the number of times" represents how many times the first control, the second control and the third control are continuously performed in the second period. Further, in the first control, "the number of times" is shown with respect to each of the first AC control for supplying the alternating current of the first frequency to the discharge lamp 90 as the electric current I, the second AC control for supplying the alternating current of the second frequency to the discharge lamp 90 as the electric current I, and a third AC control for supplying alternating current of a third frequency to the discharge lamp 90 as the electric current I. The first frequency, the second frequency and the third frequency are frequencies which are different from each other. As shown in FIG. 12, in a case where the number of frequencies used in the first control is 3 or higher, two frequencies which are randomly selected correspond to the first frequency and the second frequency.

In the third specific example, the first control, the second control, the first control and the third control are sequentially repeated as one set. Further, in the first control, the first AC control, the second AC control and the third AC control are sequentially performed (excluding a case where "the number of times" is 0). Normally, since it is preferable that accumulative values of energy given to the first electrode 91 and the second electrode 92 as the electric current I is supplied to the discharge lamp 90 be approximately the same, in a case where the electric current I has the waveforms shown in FIGS. 8B and 8C, it is preferable that the number of times of the second control and the number of times of the third control be approximately the same.

In a case where the electric current I of a relatively high frequency is supplied to the discharge lamp 90, the arc spot on the electrode of the discharge lamp 90 becomes small, and the position of the discharge starting point is easily determined. In a case where the electric current I of a relatively low frequency is supplied to the discharge lamp 90, the arc spot on the electrode of the discharge lamp 90 becomes large, and thus, it is possible to thicken the protrusion 911 and the protrusion 921 which are provided in the first electrode 91 and the second electrode 92 of the discharge lamp 90. Accordingly, as the electric current I of different frequencies is supplied to the discharge lamp 90 in the first control, it is possible to suppress deformation of the protrusion on the electrode which is the discharge starting point, and to stabilize the discharge starting point.

In the third specific example, as the state of deterioration of the discharge lamp 90 proceeds, the control section 40 may increase the ratio of the total value of the time when the frequency becomes the highest value in the first control to the total value of the time when the first control is performed. In the example shown in FIG. 12, "the time ratio of the highest value" means "the ratio of the total value of the time when the frequency becomes the highest value in the first control to the total value of the time when the first control is performed". In the example shown in FIG. 12, in a case where the drive voltage Vla is 85 V or higher, "the time ratio of the highest value" represents the ratio of "the number of times" of the third AC control to the total value of "the number of times" when the first control is performed.

In the example shown in FIG. 12, as the drive voltage Vla is increased (that is, as the state of deterioration of the discharge lamp 90 proceeds), the ratio of the total value of the time when the frequency becomes the highest value in the first control to the total value of the time when the first control is performed is increased.

As the ratio of the total value of the time when the frequency becomes the highest value in the first control to the total value of the time when the first control is performed is increased, the ratio in which the electric current I of the relatively high frequency is supplied to the discharge lamp 90 is increased, and thus, it is easy to stabilize the discharge starting point even in a case where the state of deterioration of the discharge lamp 90 proceeds.

In the third specific example, as the state of deterioration of the discharge lamp 90 proceeds, the control section 40 may decrease the ratio of the total value of the time when the frequency becomes the lowest value in the first control to the total value of the time when the first control is performed. In the example shown in FIG. 12, "the time ratio of the lowest value" means "the ratio of the total value of the time when the frequency becomes the lowest value in the first control to the total value of the time when the first control is performed". In the example shown in FIG. 12, "the time ratio of the lowest value" represents the ratio of "the number of times" of the first AC control to the total value of "the number of times" when the first control is performed.

In the example shown in FIG. 12, as the drive voltage Vla is increased (that is, as the state of deterioration of the discharge lamp 90 proceeds), the ratio of the total value of the time when the frequency becomes the lowest value in the first control to the total value of the time when the first control is performed is decreased.

As the ratio of the total value of the time when the frequency becomes the lowest value in the first control to the total value of the time when the first control is performed is decreased, the ratio in which the electric current I of the relatively high frequency is supplied to the discharge lamp 90 is increased, and thus, it is easy to stabilize the discharge starting point even in a case where the state of deterioration of the discharge lamp 90 proceeds.

In the example shown in FIG. 12, "the ratio of the second control and the third control" means "the ratio of the total value of the time when the second control and the third control are performed to the total value of the time when the first control, the second control and the third control are performed".

In the example shown in FIG. 12, as the drive voltage Vla is increased (that is, as the state of deterioration of the discharge lamp 90 proceeds), the ratio of the total value of the time when the second control and the third control are performed to the total value of the time when the first control, the second control and the third control are performed is decreased.

If the state of deterioration of the discharge lamp 90 proceeds, the meltability of the electrode of the discharge lamp 90 is decreased, and the electrode of the discharge lamp 90 may be deformed. According to the third specific example of the present embodiment, as the state of deterioration of the discharge lamp 90 proceeds, by decreasing the ratio of the total value of the time when the second control and the third control are performed to the total value of the time when the first control, the second control and the third control are performed, it is possible to reduce the ratio of the time when a state where one electrode of the discharge lamp 90 becomes the cathode is continued to the lighting time of the discharge lamp 90. Thus, it is possible to suppress positively charged particles such as metallic ions from colliding with the electrode in a state where the temperature of the electrode of the discharge lamp 90 is low. Accordingly, it is possible to suppress deformation of the electrode of the discharge lamp 90.

In the third specific example, the length of the second period may be longer than the length of the first period. As described above with reference to FIG. 7 and FIGS. 8A to 8C, in the first specific example, the length of the second period is longer than the length of the first period.

As the length of the second period becomes long, the influence on the discharge lamp 90 becomes large as a state where the temperature of the electrode is low is continued in the second period. Thus, in a case where the length of the second period is longer than the length of the first period, the effect of suppressing deformation of the electrode of the discharge lamp 90 becomes large.

1-5-6. Fourth Specific Example of Control Based on State of Deterioration of Discharge Lamp The first specific example and the fourth specific example are the same in the flowchart of the control from the time when the discharge lamp 90 is stably lighted to the time of extinguishment thereof, as described with reference to FIG. 9, and are different from each other in the table of the drive conditions used in step S102. Accordingly, hereinafter, the table of the drive conditions used in step S102 will be mainly described.

FIG. 13 is a table illustrating a drive conditions in a fourth specific example. In the example shown in FIG. 13, four types of drive conditions are stored in the storing section 44 according to the drive voltage Vla. In the example shown in FIG. 13, the "first polarity or second polarity duration time" means the "first polarity duration time" with respect to the second control, and means the "second polarity duration time" with respect to the third control. Further, in the fourth specific example, as described above with reference to FIGS. 8B and 8C, the "first polarity duration time" and the "second polarity duration time" are the sum of the DC time and the length of 0.5 cycle in the AC frequency.

The third specific example and the fourth specific example are the same in the drive conditions in the first control and are different from each other in the drive conditions in the second control and the third control. Thus, hereinafter, the drive conditions in the second control and the third control will be mainly described.

In the example shown in FIG. 13, as the drive voltage Vla is increased (that is, as the state of deterioration of the discharge lamp 90 proceeds), the maximum value of the time when the first polarity is continued in the second control and the maximum value of the time when the second polarity is continued in the third control are decreased.

If the state of deterioration of the discharge lamp 90 proceeds, the meltability of the electrode of the discharge lamp 90 is decreased, and the electrode of the discharge lamp 90 may be deformed. According to the fourth specific example of the present embodiment, as the state of deterioration of the discharge lamp 90 proceeds, the maximum value of the time when the first polarity is continued in the second control and the maximum value of the time when the second polarity is continued in the third control are decreased, and thus, it is possible to shorten the time when a state where one electrode of the discharge lamp 90 becomes the cathode is continued. Thus, it is possible to suppress positively charged particles such as metallic ions in the discharge space 93 of the discharge lamp 90 from colliding with the electrode, in a state where the temperature of the electrode is low. Accordingly, it is possible to suppress deformation of the electrode of the discharge lamp 90.

Further, in the fourth specific example, the same effect as in the third specific example relating to the first control is achieved.

In each embodiment as described above, the projector 500 has a configuration in which the display image is stereoscopically shown to the observer using the first image and the second image as the left eye image and the right eye image, respectively, but is not limited thereto. For example, as the projector 500, a configuration may be employed in which the first image and the second image are displayed as images having different content and two display images (the first image and the second image) are visually shown to different observers, respectively.

In such a configuration, as the active shutter glasses 410, two types of glasses in which a shutter which is operated in a similar way to the above-mentioned right shutter 412 is installed on the left and right sides and glasses in which a shutter which is operated in a similar way to the above-mentioned left shutter 414 is installed on the left and right sides may be used.

In each embodiment as described above, the projector which uses three liquid crystal panels has been described as an example, but the invention is not limited thereto and may be applied to a projector which uses one, two, four or more liquid crystal panels.

In each embodiment as described above, transmission type projector has been described, but the invention is not limited thereto and may be applied to a reflection type projector. Here, the "transmission type" means a type in which an electro-optic modulation device as optical modulation unit such as a transmission type liquid crystal panel transmits light, and the "reflection type" means a type in which an electro-optic modulation device as optical modulation unit such as a reflection type liquid crystal panel or a micromirror type optical modulation device reflects light. As the micromirror type optical modulation device, for example, DMD (digital micromirror device, trademark of Texas Instruments Inc.) may be used. In a case where the invention is applied to the reflection type projector, it is possible to achieve the same effect as in the transmission type projector.

The invention may be applied to the case of a front projection type projector which projects a projection image from the side of observation, and may be applied to the case of a rear projection type projector which projects the projection image from the side opposite to the side of observation.

In each embodiment as described above, in the period of ½ cycle of polarity inversion of the electric current I, the absolute value of the electric current I becomes constant. That is, the waveform of the electric current I is a so-called square waveform. The waveform of the electric current I is not limited thereto, and may be a waveform in which the absolute value of the electric current I uses different values in the period of one cycle of the polarity inversion of the electric current I such as a waveform which starts in a period when the absolute value of the electric current I becomes a first electric current value and ends in a period when the absolute value of the electric current I becomes a second electric current value larger than the first electric current value in the period of half cycle of the polarity inversion of the electric current I, or a waveform in which the absolute value of the electric current I is monotonously increased in the period of the half cycle of the polarity inversion of the electric current I.

The invention is not limited to the above-described embodiments, and various modifications may be made in the range of the spirit of the invention.

The invention includes a configuration which is substantially the same as the configuration described in the embodiments (for example, a configuration in which functions, ways and results are the same, or a configuration in which objects and effects are the same). Further, the invention includes a configuration in which parts which are not essential in the configuration described in the embodiment are replaced. Further, the invention includes a configuration having the same operations and effects as in the configuration described in the embodiment, or a configuration capable of achieving the same object as in the configuration described in the embodiment. Further, the invention includes a configuration in which known techniques are added to the configuration described in the embodiment.

The entire disclosure of Japanese Patent Application No. 2011-221963, filed Oct. 6, 2011 is expressly incorporated by reference herein.

What is claimed is:

1. A projector that switches and alternately outputs a first image and a second image at a predetermined timing, comprising:
    a discharge lamp that includes a first electrode and a second electrode;
    a discharge lamp drive section that supplies electric current for driving the discharge lamp to the discharge lamp;
    a state detecting section that detects a state of deterioration of the discharge lamp; and
    a control section that controls the discharge lamp drive section,
    wherein a period interposed between switching timings which are temporally adjacent to each other starts in a first period and ends in a second period,
    wherein the control section controls the discharge lamp drive section so that an absolute value of the electric current is relatively decreased in the first period and is relatively increased in the second period, wherein in the second period, the control section performs a first control for controlling the discharge lamp drive section to supply an alternating current to the discharge lamp, a second control for controlling the discharge lamp drive section to supply, to the discharge lamp, an electric current in which a maximum value of a time when a first polarity in which the first electrode becomes the anode is continued is longer than a maximum value of a time when the first polarity is continued in the first control, and a third control for controlling the discharge lamp drive section to supply, to the discharge lamp, an electric current in which a maximum value of a time when a second polarity in which the second electrode becomes the anode is continued is longer than a maximum value of a time when the second polarity is continued in the first control, and wherein as the state of deterioration proceeds, the control section decreases at least one of the maximum value of the time when the first polarity is continued in the second control and the maximum value of the time when the second polarity is continued in the third control.

2. A projector that switches and alternately outputs a first image and a second image at a predetermined timing, comprising:

a discharge lamp that includes a first electrode and a second electrode;

a discharge lamp drive section that supplies an electric current for driving the discharge lamp to the discharge lamp;

a state detecting section that detects a state of deterioration of the discharge lamp; and a control section that controls the discharge lamp drive section, wherein a period interposed between switching timings which are temporally adjacent to each other starts in a first period and ends in a second period, wherein the control section controls the discharge lamp drive section so that an absolute value of the electric current is relatively decreased in the first period and is relatively increased in the second period, wherein in the second period, the control section performs a first control for controlling the discharge lamp drive section to supply an alternating current to the discharge lamp, a second control for controlling the discharge lamp drive section to supply, to the discharge lamp, an electric current including a period when a maximum value of a time when a first polarity in which the first electrode becomes the anode is continued is longer than a maximum value of a time when the first polarity is continued in the first control, and a third control for controlling the discharge lamp drive section to supply, to the discharge lamp, an electric current including a period when a maximum value of a time when a second polarity in which the second electrode becomes the anode is continued is longer than a maximum value of a time when the second polarity is continued in the first control, and wherein as the state of deterioration proceeds, the control section decreases a ratio of a total value of times when the second control and the third control are performed to a total value of times when the first control, the second control and the third control are performed.

3. The projector according to claim 1, wherein as the state of deterioration proceeds, the control section increases frequency in the first control.

4. The projector according to claim 1, wherein the control section includes, as the first control, a first AC control for controlling the discharge lamp drive section to supply the alternating current of a first frequency to the discharge lamp and a second AC control for controlling the discharge lamp drive section to supply the alternating current of a second frequency different from the first frequency to the discharge lamp.

5. The projector according to claim 4, wherein as the state of deterioration proceeds, the control section increases a ratio of a total value of a time when frequency becomes the highest value in the first control to a total value of a time when the first control is performed.

6. The projector according to claim 4, wherein as the state of deterioration proceeds, the control section decrease a ratio of a total value of a time when frequency becomes the lowest value in the first control to a total value of a time when the first control is performed.

7. The projector according to claim 1, wherein a length of the second period is longer than a length of the first period.

8. The projector according to claim 2, wherein as the state of deterioration proceeds, the control section increases frequency in the first control.

9. The projector according to claim 2, wherein the control section includes, as the first control, a first AC control for controlling the discharge lamp drive section to supply the alternating current of a first frequency to the discharge lamp and a second AC control for controlling the discharge lamp drive section to supply the alternating current of a second frequency different from the first frequency to the discharge lamp.

10. The projector according to claim 9, wherein as the state of deterioration proceeds, the control section increases a ratio of a total value of a time when frequency becomes the highest value in the first control to a total value of a time when the first control is performed.

11. The projector according to claim 9, wherein as the state of deterioration proceeds, the control section decrease a ratio of a total value of a time when frequency becomes the lowest value in the first control to a total value of a time when the first control is performed.

12. The projector according to claim 2, wherein a length of the second period is longer than a length of the first period.

* * * * *